US012572326B2

(12) United States Patent
O'Mara et al.

(10) Patent No.: US 12,572,326 B2
(45) Date of Patent: Mar. 10, 2026

(54) DIGITAL ASSISTANT FOR MOVING AND COPYING GRAPHICAL ELEMENTS

(71) Applicant: Apple Inc., Cupertino, CA (US)

(72) Inventors: Christine S. O'Mara, Bellevue, WA (US); Jessica J. Peck, Morgan Hill, CA (US); Harry M. Simmonds, Calgary (CA); Felicia W. Edwards, Loveland, CO (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 17/942,496

(22) Filed: Sep. 12, 2022

(65) Prior Publication Data

US 2023/0081605 A1      Mar. 16, 2023

Related U.S. Application Data

(60) Provisional application No. 63/245,071, filed on Sep. 16, 2021.

(51) Int. Cl.
*G06F 3/16*          (2006.01)
*G06F 3/01*          (2006.01)
(Continued)

(52) U.S. Cl.
CPC .............. *G06F 3/167* (2013.01); *G06F 3/013* (2013.01); *G06F 3/017* (2013.01);
(Continued)

(58) Field of Classification Search
CPC .......... G06F 3/167; G06F 3/013; G06F 3/017; G06F 3/04842; G06F 3/04845; G06F 9/453; G06F 3/04817
See application file for complete search history.

(56) References Cited

U.S. PATENT DOCUMENTS 8,031,943 B2    10/2011  Chen et al.
8,117,542 B2     2/2012  Radtke et al.
(Continued)

FOREIGN PATENT DOCUMENTS

CN        104360990 A      2/2015
CN        107589841 A      1/2018
(Continued)

OTHER PUBLICATIONS

International Search Report and Written Opinion received for PCT Patent Application No. PCT/US2022/043591, mailed on Jan. 5, 2023, 13 pages.
(Continued)

*Primary Examiner* — Tan H Tran
(74) *Attorney, Agent, or Firm* — YHE Law LLP

(57)          ABSTRACT

An example process includes while displaying, on a display, a graphical element having a first display location, receiving a natural language input including a deictic reference to the graphical element; determining whether the natural language input corresponds to a user intent to move or copy the graphical element; in accordance with a determination that the natural language input corresponds to the user intent to move or copy the graphical element: determining, based on detected user gaze input, that the deictic reference refers to the graphical element; and in accordance with determining that the deictic reference refers to the graphical element, displaying the graphical element at a second display location different from the first display location.

45 Claims, 9 Drawing Sheets

(51) Int. Cl.
| | |
|---|---|
| *G06F 3/04817* | (2022.01) |
| *G06F 3/04842* | (2022.01) |
| *G06F 3/04845* | (2022.01) |
| *G06F 9/451* | (2018.01) |

(52) U.S. Cl.
CPC ...... *G06F 3/04842* (2013.01); *G06F 3/04845* (2013.01); *G06F 9/453* (2018.02); *G06F 3/04817* (2013.01)

(56) References Cited

U.S. PATENT DOCUMENTS

| | | | |
|---|---|---|---|
| 8,201,109 B2 | 6/2012 | Van Os et al. | |
| 8,219,406 B2 | 7/2012 | Yu et al. | |
| 8,571,851 B1 | 10/2013 | Tickner et al. | |
| 8,964,947 B1 | 2/2015 | Noolu et al. | |
| 9,250,703 B2 | 2/2016 | Hernandez-abrego et al. | |
| 9,274,598 B2 | 3/2016 | Beymer et al. | |
| 9,842,584 B1 * | 12/2017 | Hart ........................ | G10L 15/22 |
| 9,990,921 B2 | 6/2018 | Vanblon et al. | |
| 10,025,378 B2 | 7/2018 | Venable et al. | |
| 10,176,808 B1 | 1/2019 | Lovitt et al. | |
| 10,228,904 B2 | 3/2019 | Raux | |
| 10,242,501 B1 | 3/2019 | Pusch et al. | |
| 10,248,308 B2 | 4/2019 | Karunamuni et al. | |
| 10,726,631 B1 | 7/2020 | Ha | |
| 10,732,708 B1 | 8/2020 | Roche et al. | |
| 11,755,275 B2 | 9/2023 | Lovitt | |
| 12,020,667 B2 | 6/2024 | Griswold et al. | |
| 2009/0058810 A1 * | 3/2009 | Kikuchi .............. | G06F 3/04892 |
| | | | 345/168 |
| 2009/0292987 A1 | 11/2009 | Sorenson | |
| 2010/0079508 A1 | 4/2010 | Hodge et al. | |
| 2012/0259638 A1 | 10/2012 | Kalinli | |
| 2012/0295708 A1 | 11/2012 | Hernandez-abrego et al. | |
| 2013/0300648 A1 | 11/2013 | Kim et al. | |
| 2013/0304476 A1 | 11/2013 | Kim et al. | |
| 2013/0304479 A1 | 11/2013 | Teller et al. | |
| 2013/0342672 A1 | 12/2013 | Gray et al. | |
| 2014/0122086 A1 | 5/2014 | Kapur et al. | |
| 2014/0218372 A1 * | 8/2014 | Missig ................ | G06F 3/04883 |
| | | | 345/173 |
| 2014/0249817 A1 | 9/2014 | Hart et al. | |
| 2014/0258905 A1 | 9/2014 | Lee et al. | |
| 2015/0161997 A1 * | 6/2015 | Wetsel .................... | G06F 3/167 |
| | | | 704/275 |
| 2015/0193018 A1 | 7/2015 | Venable et al. | |
| 2015/0347733 A1 | 12/2015 | Tsou et al. | |
| 2015/0364140 A1 | 12/2015 | Thörn | |
| 2016/0026242 A1 | 1/2016 | Burns et al. | |
| 2016/0091967 A1 * | 3/2016 | Prokofieva .............. | G10L 17/22 |
| | | | 345/156 |
| 2016/0116980 A1 * | 4/2016 | George-Svahn ...... | G06F 3/0482 |
| | | | 345/173 |
| 2016/0132290 A1 | 5/2016 | Raux | |

| | | | |
|---|---|---|---|
| 2016/0195924 A1 | 7/2016 | Weber et al. | |
| 2016/0217794 A1 | 7/2016 | Imoto et al. | |
| 2016/0283455 A1 * | 9/2016 | Mardanbegi ........... | G06F 3/038 |
| 2017/0169818 A1 | 6/2017 | Vanblon et al. | |
| 2017/0235361 A1 | 8/2017 | Rigazio et al. | |
| 2017/0235618 A1 | 8/2017 | Lin et al. | |
| 2017/0262051 A1 | 9/2017 | Tall et al. | |
| 2018/0165857 A1 | 6/2018 | Lee et al. | |
| 2018/0225131 A1 | 8/2018 | Tommy et al. | |
| 2018/0300952 A1 | 10/2018 | Evans et al. | |
| 2019/0019508 A1 | 1/2019 | Rochford et al. | |
| 2019/0139541 A1 | 5/2019 | Andersen et al. | |
| 2019/0362557 A1 * | 11/2019 | Lacey ........................ | G06T 5/20 |
| 2019/0391726 A1 * | 12/2019 | Iskandar ................. | G06F 3/016 |
| 2020/0090653 A1 * | 3/2020 | Luo ..................... | G10L 15/1822 |
| 2020/0103963 A1 * | 4/2020 | Kelly ...................... | G06F 3/167 |
| 2020/0219501 A1 | 7/2020 | Cartwright et al. | |
| 2020/0227034 A1 | 7/2020 | Summa et al. | |
| 2020/0304955 A1 | 9/2020 | Gross et al. | |
| 2021/0012113 A1 * | 1/2021 | Petill .................. | G02B 27/0101 |
| 2021/0089124 A1 | 3/2021 | Manjunath et al. | |
| 2021/0097776 A1 | 4/2021 | Faulkner et al. | |
| 2021/0174022 A1 | 6/2021 | Ishikawa et al. | |
| 2021/0258554 A1 * | 8/2021 | Bruls ...................... | G06F 3/013 |
| 2021/0342050 A1 * | 11/2021 | Wang .................... | G06F 3/0488 |
| 2022/0155857 A1 * | 5/2022 | Lee .......................... | G06F 3/013 |
| 2022/0254341 A1 | 8/2022 | Naganna et al. | |
| 2023/0401795 A1 | 12/2023 | Streja et al. | |
| 2023/0401798 A1 | 12/2023 | Bigham et al. | |
| 2024/0248678 A1 | 7/2024 | Krivoruchko et al. | |

FOREIGN PATENT DOCUMENTS

| | | |
|---|---|---|
| JP | 2012-220959 A | 11/2012 |
| JP | 2017-211608 A | 11/2017 |
| KR | 10-2014-0007282 A | 1/2014 |
| WO | 2016/049439 A1 | 3/2016 |
| WO | 2023/239663 A1 | 12/2023 |

OTHER PUBLICATIONS

Gu et al., "Alohomora: Motion-Based Hotword Detection in Head-Mounted Displays", IEEE Internet of Things Journal, vol. 7, No. 1, Jan. 2020, pp. 611-620.

International Preliminary Report on Patentability received for PCT Patent Application No. PCT/US2022/043591, mailed on Mar. 28, 2024, 9 pages.

Yeh et al., "Dialog modeling in audiobook synthesis", Retrieved on Sep. 27, 2023, 6 pages.

Zhou et al., "Using Paralinguistic Information to Disambiguate User Intentions for Distinguishing Phrase Structure and Sarcasm in Spoken Dialog Systems", IEEE Spoken Language Technology Workshop (SLT), Jan. 19, 2021, pp. 1020-1027.

Office Action received for European Patent Application No. 22787050.8, mailed on Sep. 30, 2025, 5 pages.

* cited by examiner

System
100

Processor(s)
102

RF Circuitry(ies)
104

Memory(ies)
106

100a

Communication Bus(es)
150

Image
Sensor(s)
108

Orientation
Sensor(s)
110

Microphone(s)
112

Touch-
sensitive
Surface(s)
122

Location
Sensor(s)
116

Speaker(s)
118

Display(s)
120

500

502
While displaying a graphical element having a first location, receive natural language input 504
User intent to move or copy ?

NO

YES

506
Perform task

508
Determine that deictic reference refers to the graphical element

510
Cause the graphical element to be associated with second location

DIGITAL ASSISTANT FOR MOVING AND COPYING GRAPHICAL ELEMENTS

CROSS REFERENCE TO RELATED APPLICATIONS

This Application claims priority to U.S. Patent Application No. 63/245,071, filed on Sep. 16, 2021, entitled "DIGITAL ASSISTANT FOR MOVING AND COPYING GRAPHICAL ELEMENTS," the content of which is hereby incorporated by reference in its entirety.

FIELD

This relates to using a digital assistant to move and copy items between locations.

BACKGROUND

Digital assistants can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

SUMMARY

Example methods are disclosed herein. An example method includes at an electronic device having one or more processors, memory, and a display: while displaying, on the display, a graphical element having a first display location, receiving a natural language input including a deictic reference to the graphical element; determining whether the natural language input corresponds to a user intent to move or copy the graphical element; in accordance with a determination that the natural language input corresponds to the user intent to move or copy the graphical element: determining, based on detected user gaze input, that the deictic reference refers to the graphical element; and in accordance with determining that the deictic reference refers to the graphical element, displaying the graphical element at a second display location different from the first display location.

Example non-transitory computer-readable media are disclosed herein. An example non-transitory computer-readable storage medium stores one or more programs. The one or more programs comprise instructions, which when executed by one or more processors of an electronic device having a display, cause the electronic device to: while displaying, on the display, a graphical element having a first display location, receive a natural language input including a deictic reference to the graphical element; determine whether the natural language input corresponds to a user intent to move or copy the graphical element; in accordance with a determination that the natural language input corresponds to the user intent to move or copy the graphical element: determine, based on detected user gaze input, that the deictic reference refers to the graphical element; and in accordance with determining that the deictic reference refers to the graphical element, display the graphical element at a second display location different from the first display location.

Example electronic devices are disclosed herein. An example electronic device comprises a display, one or more processors; a memory; and one or more programs, where the one or more programs are stored in the memory and configured to be executed by the one or more processors, the one or more programs including instructions for: while displaying, on the display, a graphical element having a first display location, receiving a natural language input including a deictic reference to the graphical element; determining whether the natural language input corresponds to a user intent to move or copy the graphical element; in accordance with a determination that the natural language input corresponds to the user intent to move or copy the graphical element: determining, based on detected user gaze input, that the deictic reference refers to the graphical element; and in accordance with determining that the deictic reference refers to the graphical element, displaying the graphical element at a second display location different from the first display location.

Displaying the graphical element at the second display location when predetermined conditions are met allows an electronic device to efficiently move or copy an item to a target location upon user request. For example, a user can request to copy an item to a target location by asking a digital assistant to "copy this over there." The digital assistant can determine the item and the target location respectively referred to by the deictic references "this" and "there," thereby allowing users to copy or move items without having to explicitly specify the item and the target location (e.g., without having to ask to "move the photo named photo #1 to my recent photos folder"). Displaying the graphical element at the second display location when predetermined conditions are met without requiring further user input improves device operability and makes the user-device interaction more efficient (e.g., by reducing user inputs otherwise required to move or copy items, by increasing the efficiency of moving or copying items) which additionally, reduces power usage and improves device battery life by enabling quicker and more efficient device usage.

Example methods are disclosed herein. An example method includes at an electronic device having one or more processors, memory, and a display: while displaying, on the display, a graphical element having a first location, receiving a natural language input including a deictic reference to the graphical element; determining whether the natural language input corresponds to a user intent to move or copy the graphical element; in accordance with a determination that the natural language input corresponds to the user intent to move or copy the graphical element: determining, based on detected user gaze input, that the deictic reference refers to the graphical element; and in accordance with determining that the deictic reference refers to the graphical element, causing the graphical element to be associated with a second location different from the first location.

Example non-transitory computer-readable media are disclosed herein. An example non-transitory computer-readable storage medium stores one or more programs. The one or more programs comprise instructions, which when executed by one or more processors of an electronic device having a display, cause the electronic device to: while displaying, on the display, a graphical element having a first location, receive a natural language input including a deictic reference to the graphical element; determine whether the natural language input corresponds to a user intent to move or copy the graphical element; in accordance with a determination that the natural language input corresponds to the user intent to move or copy the graphical element: determine, based on detected user gaze input, that the deictic reference refers to the graphical element; and in accordance with determining that the deictic reference refers to the graphical element, cause the graphical element to be associated with a second location different from the first location.

Example electronic devices are disclosed herein. An example electronic device comprises a display, one or more processors; a memory; and one or more programs, where the one or more programs are stored in the memory and configured to be executed by the one or more processors, the one or more programs including instructions for: while displaying, on the display, a graphical element having a first location, receiving a natural language input including a deictic reference to the graphical element; determining whether the natural language input corresponds to a user intent to move or copy the graphical element; in accordance with a determination that the natural language input corresponds to the user intent to move or copy the graphical element: determining, based on detected user gaze input, that the deictic reference refers to the graphical element; and in accordance with determining that the deictic reference refers to the graphical element, causing the graphical element to be associated with a second location different from the first location.

Causing the graphical element to be associated with a second location when predetermined conditions are met allows an electronic device to efficiently move or copy an item to a target location upon user request. Causing the graphical element to be associated with the second location when predetermined conditions are met without requiring further user input improves device operability and makes the user-device interaction more efficient (e.g., by reducing user inputs otherwise required to move or copy items, by increasing the efficiency of moving or copying items) which additionally, reduces power usage and improves device battery life by enabling quicker and more efficient device usage.

DESCRIPTION

Figure 1A:
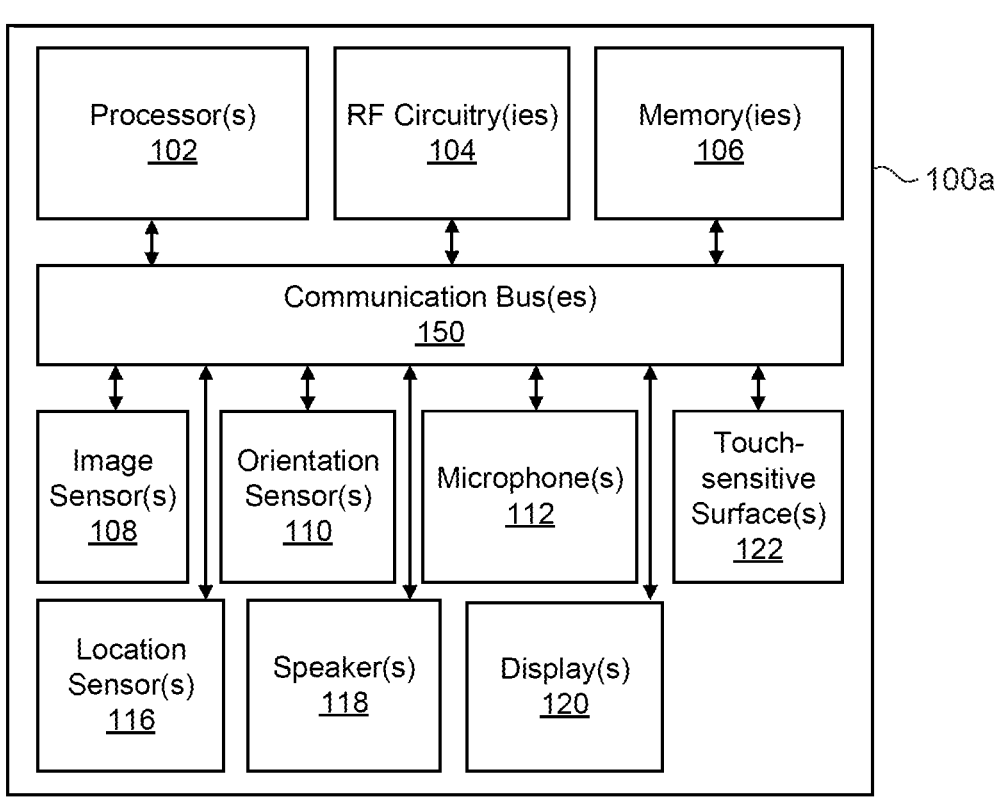
FIGS. 1A-1B depict exemplary systems for use in various computer-generated reality technologies, including virtual reality and mixed reality.

Various examples of electronic systems and techniques for using such systems in relation to various computer-generated reality technologies are described.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
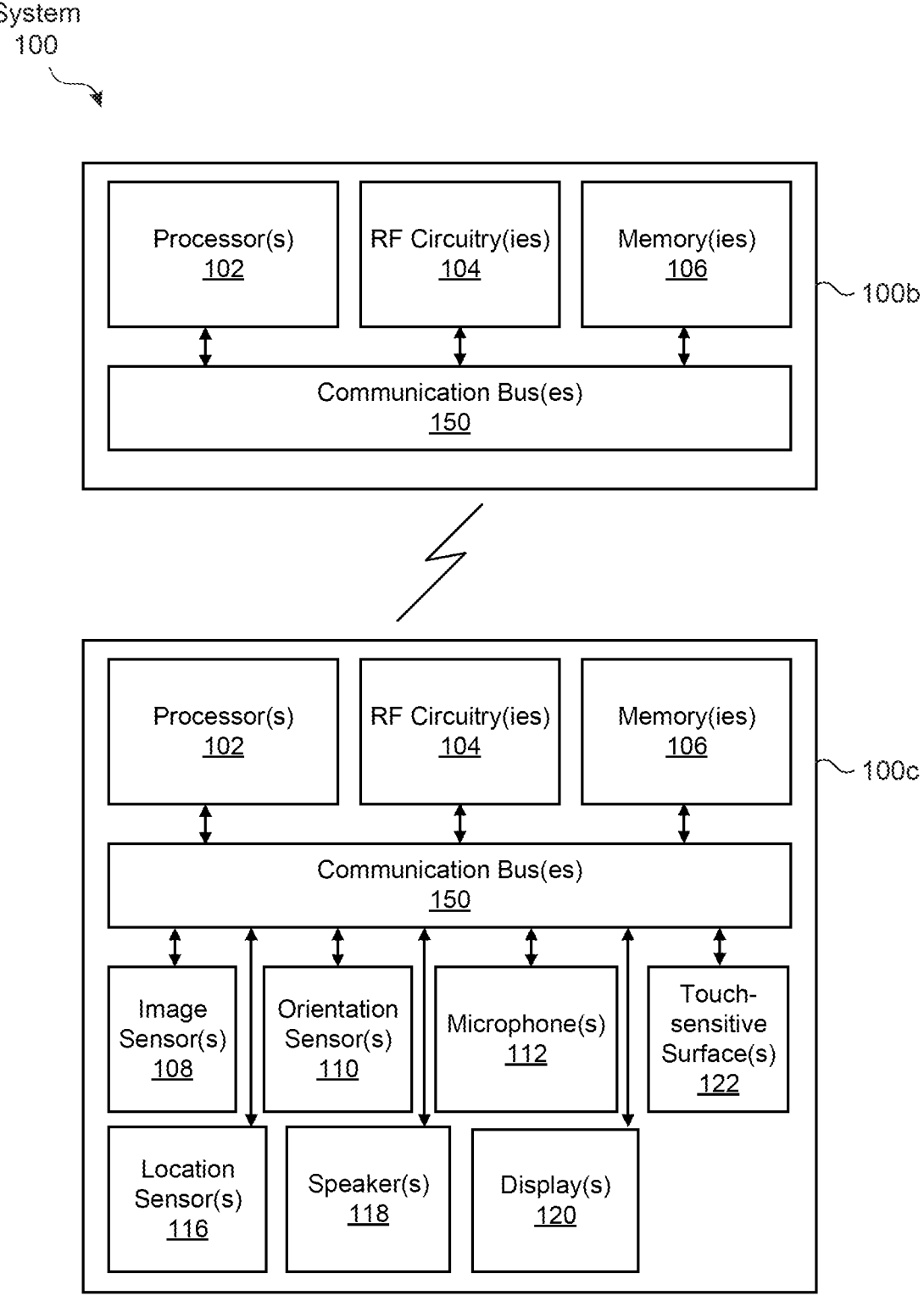

FIG. 1A and FIG. 1B depict exemplary system 100 for use in various computer-generated reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensor(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2:
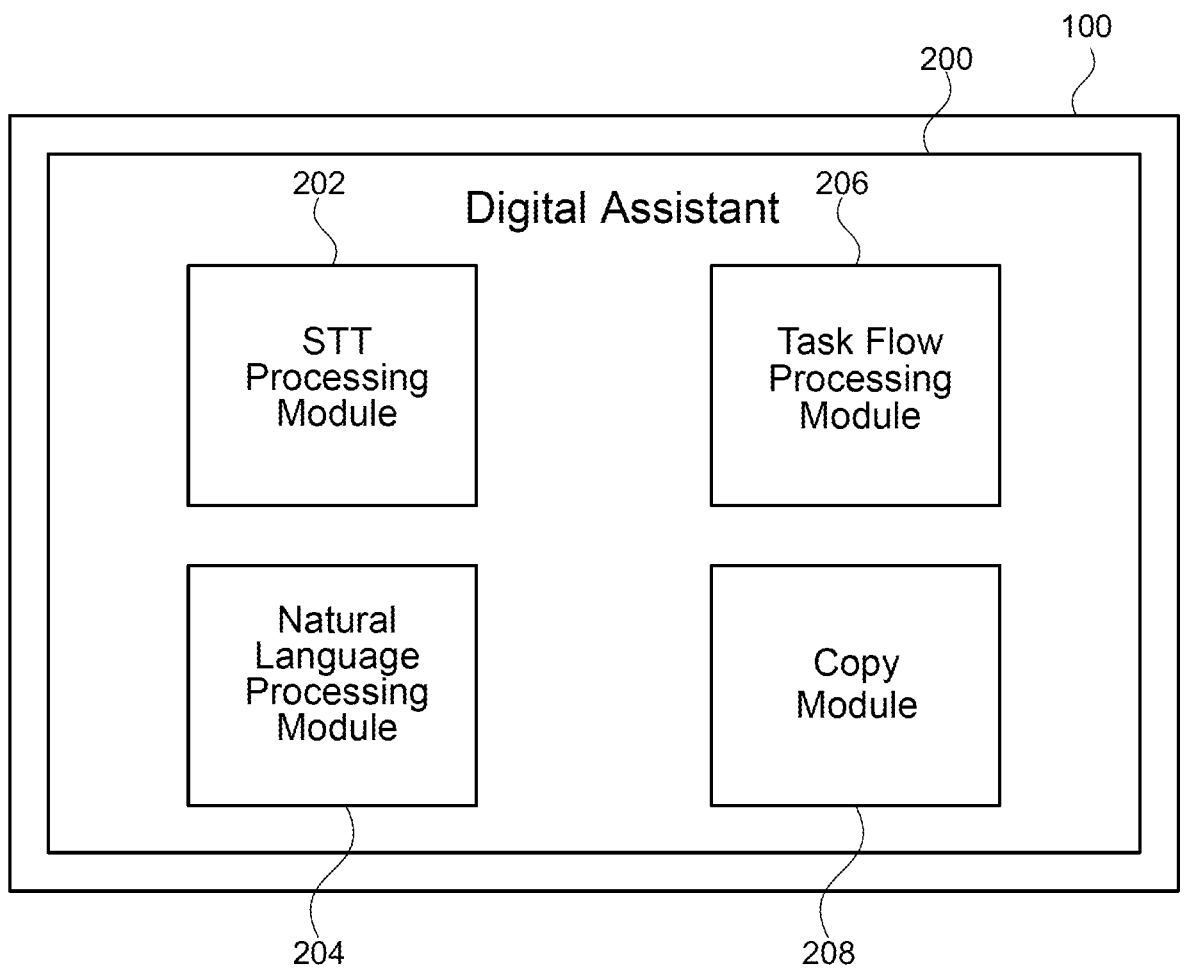
FIG. 2 illustrates a block diagram of a digital assistant, according to various examples.

FIG. 2 illustrates a block diagram of digital assistant (DA) 200, according to various examples.

In some examples, as shown, DA 200 is at least partially implemented within system 100, e.g., within device 100*a*, 100*b*, or 100*c*. For example, DA 200 is at least partially implemented as computer-executable instructions stored in memory(ies) 106. In some examples, DA 200 is distributed across multiple computers and/or systems. For example, some of the modules and functions of DA 200 are divided into a server portion and a client portion, where the client portion resides on one or more user devices (e.g., device 100*a*, 100*b*, 100*c*) or systems (e.g., system 100) and, optionally, communicates with the server portion through one or more networks. The various components and functions of DA 200 are implemented in hardware, software instructions for execution by one or more processors, firmware, including one or more signal processing and/or application specific integrated circuits, or a combination or sub-combination thereof. DA 200 is only one example of a DA, and DA 200 can have more or fewer components than shown, can combine two or more components, or can have a different configuration or arrangement of the components.

In some examples, DA 200 performs at least some of: converting speech input into text; identifying a user's intent expressed in a natural language input received from the user; actively eliciting and obtaining information needed to fully identify the user's intent (e.g., by disambiguating words, names, intentions, etc.); determining a task flow for fulfilling the identified intent; and executing the task flow to fulfill the identified intent.

In some examples, DA 200 includes natural language processing module 204 configured to identify the user intent. Natural language processing module 204 takes the n-best candidate text representation(s) ("word sequence(s)" or "token sequence(s)") generated by speech-to-text (STT) processing module 202 and attempts to associate each of the candidate text representations with one or more "actionable intents" recognized by the DA. An "actionable intent" (or "user intent") represents a task that can be performed by the DA, and can have an associated task flow implemented in task flow processing module 206. The associated task flow is a series of programmed actions and steps that the DA takes in order to perform the task. The scope of a DA's capabilities is, in some examples, dependent on the number and variety of task flows that are implemented in task flow processing module 206, or in other words, on the number and variety of "actionable intents" the DA recognizes.

In some examples, once natural language processing module 204 identifies an actionable intent based on the user request, natural language processing module 204 causes task flow processing module 206 to perform the actions required to satisfy the user request. For example, task flow processing module 206 executes the task flow corresponding to the identified actionable intent to perform a task satisfying the user request. In some examples, performing the task includes causing system 100 to provide graphical, audio, and/or haptic output indicating the performed task.

In some examples, DA 200 includes copy module 208. Copy module 208 is configured to determine an item (e.g., a graphical element and/or the data represented by the graphical element) to move or copy. Copy module 208 is further configured to determine a target location where to move or copy the item. In some examples, natural language processing module 204 invokes the services of copy module 208 in accordance with determining a user intent to move or copy a graphical element. For example, as discussed in greater detail below, once natural language processing module 204 determines a user intent to copy a graphical element based on the speech input "copy this over there," natural language processing module 204 invokes copy module 208 to determine the graphical element and the target location respectively referred to by "this" and "there." In some examples, copy module 208 determines the graphical element and the target location based on user interaction data (e.g., indicating user gesture input and/or user gaze input), discussed below. In some examples, copy module 208 determines the target location based on the natural language input. For example, if the natural language input specifies an application (e.g., a photos application), copy module 208 determines the target location to correspond to the application (e.g., a "recently added" folder of the photos application).

In some examples, copy module 208 provides the determined graphical element and target location to task flow processing module 206 as parameters for executing task flows. For example, task flow processing module 206 implements a copy task flow (e.g., configured to obtain data represented by a graphical element) and a paste task flow (e.g., configured to copy and/or move the obtained data to the target location). Task flow processing module 206 can execute the copy task flow, using the parameter of the determined graphical element, to obtain the data. After executing the copy task flow, task flow processing module 206 can execute the paste task flow, using parameters of the obtained data and the target location, to move or copy the obtained data to the target location.

FIGS. 3A-3H illustrate techniques for using DA 200 to move or copy items, according to various examples.

Figure 3A:
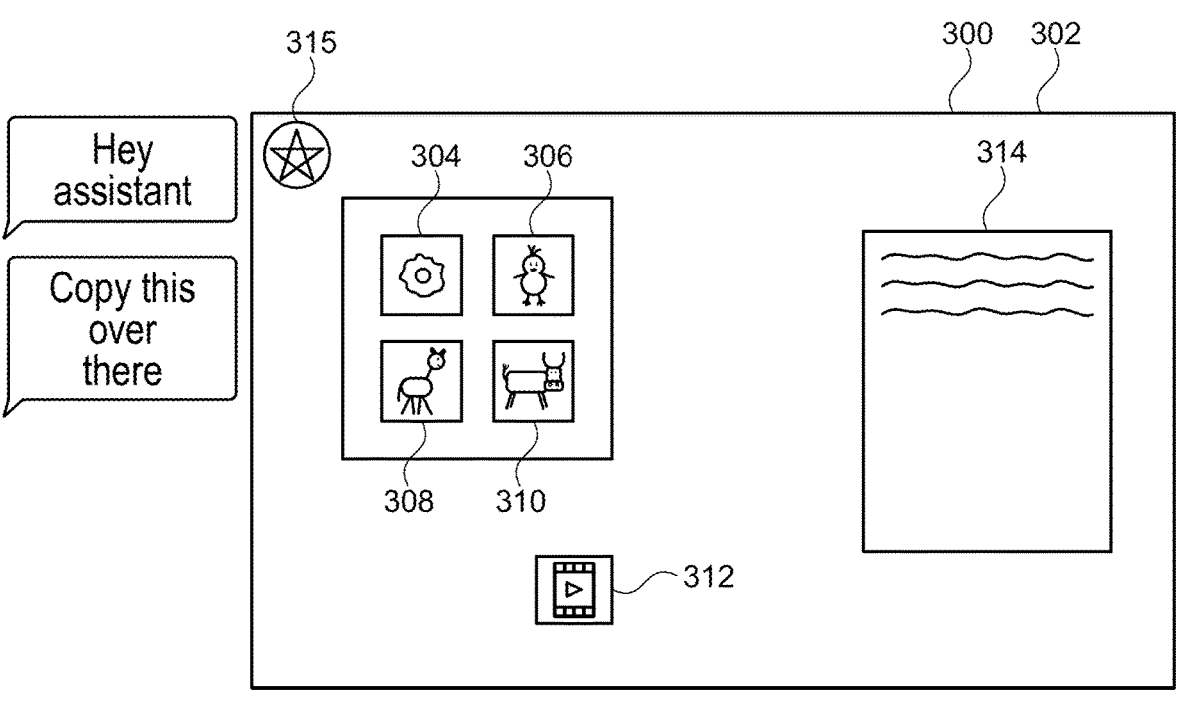
FIGS. 3A-3H illustrate techniques for using a digital assistant to move or copy items, according to various examples.

FIG. 3A shows display 302 of device 300. Device 300 is implemented, for example, as a head-mounted device, a smartphone device, a laptop computer, a desktop computer, a tablet device, a smart speaker, a television, or a smart home appliance. Device 300 is implemented as device 100a or device 100c.

Display 302 displays graphical elements 304, 306, 308, 310, 312, and 314. Graphical elements can represent data of various types such as photos, videos, emails, text messages, contact information, notes, word processing documents, presentations, calendar items, media items (e.g., songs, audiobooks), physical locations (e.g., GPS coordinates), and any other file type (e.g., XML files, PDF files). In some examples, a graphical element directly displays the represented data, e.g., displays a photo, displays text of a text message, displays contact information (e.g., phone number, email address), or displays the content of a word processing document. In some examples, a graphical element includes an icon (e.g., file icon) corresponding to the represented data (e.g., an icon indicating a photo, an icon indicating a calendar item, an icon indicating a media item, an icon indicating a word processing document) but does not directly display the represented data. For example, in FIG. 3A, graphical elements 304, 306, 308, 310, and 314 each directly display the respective represented data, e.g., photos for graphical elements 304, 306, 308, and 310 and a word processing document for graphical element 314. Graphical element 312 includes an icon (e.g., a movie icon) corresponding to a represented video but does not directly display the video.

In some examples, a graphical element includes a virtual object (e.g., a virtual chair). In some examples, a graphical element includes a displayed representation of a physical object, e.g., if the graphical element is displayed via pass-through video of a physical environment.

Graphical elements 304-314 each have respective display locations specifying where the graphical elements are currently displayed. For example, display 302 displays graphical elements 304-310 in a user interface of a photos application of device 300, displays graphical element 312 on the desktop (e.g., home screen) of device 300, and displays graphical element 314 in the foreground of display 302 over the desktop. In some examples, a display location of a graphical element corresponds to a directory (e.g., a folder) and/or an application of device 300. For example, graphical elements 304-310 each correspond to the photos application and each correspond to a folder associated with the photos application. Graphical element 312 corresponds to a folder associated with the desktop. Graphical element 314 corresponds to a word processing application and corresponds to a folder including the word processing document.

In some examples, device 300 receives input to invoke DA 200. Example input to invoke DA 200 includes speech input including a predetermined spoken trigger (e.g., "hey assistant," "turn on," and the like), predetermined types of gesture input (e.g., hand motions) detected by device 300, and selection of a physical or virtual button of device 300. In some examples, input to invoke DA 200 includes user gaze input, e.g., indicating that user gaze is directed to a particular displayed user interface element for a predetermined duration. In some examples, device 300 determines that user gaze input is input to invoke DA 200 based on the timing of received natural language input relative to the user gaze input. For example, user gaze input invokes DA 200 if device 300 determines that user gaze is directed to the user interface element at a start time of the natural language input and/or at an end time of the natural language input. In the example of FIG. 3A, a user provides the spoken trigger "hey assistant" to invoke DA 200.

Responsive to receiving the input to invoke DA 200, DA 200 invokes. For example, device 300 displays DA indicator 315 to indicate invoked DA 200 and begins to execute certain processes corresponding to DA 200. In some examples, once DA 200 invokes, DA 200 processes received natural language input to perform various tasks (e.g., copying and moving graphical elements), as described below. For simplicity, the description of FIGS. 3B-3H below does not explicitly describe receiving input to invoke DA 200. However, it will be appreciated that, in some examples, DA 200 processes the natural language inputs described with respect to FIGS. 3B-3H in accordance with receiving input to invoke DA 200.

In FIG. 3A, while displaying graphical element 304, device 300 receives a natural language input, e.g., "move this over there." The natural language input includes a deictic reference (e.g., "this," "that," "it," "the file," "the picture", "the thing," and the like) to graphical element 304. Accordingly, users are not required to explicitly specify a graphical element to move or copy (e.g., to specify the file name of graphical element 304), thereby allowing users to easily and efficiently move or copy graphical elements. DA 200 determines the correct graphical element (e.g., graphical element 304 referred to by the deictic reference) according to the techniques below.

DA 200 determines whether the natural language input corresponds to a user intent to move or copy a graphical element, e.g., in accordance with invoking. For example, DA 200 processes the natural language input using natural language processing module 204 to determine the user intent based on detecting words and/or phrases such as "move," "copy," "transfer," "paste," "place this," and "over there" in the natural language input. In some examples, in accordance with a determination that the natural language input does not correspond to a user intent to move or copy the graphical element, DA 200 performs a task based on a determined user intent.

In accordance with a determination that the natural language input corresponds to a user intent to move or copy a graphical element, DA 200 determines the graphical element, e.g., determines that the deictic reference refers to the graphical element. In some examples, determining that the deictic reference refers to a graphical element includes identifying a set of graphical elements displayed while the natural language input is received, where each graphical element of the set of graphical elements corresponds to a same predetermined type of action, e.g., a copy or move action. Accordingly, DA 200 identifies all currently displayed graphical element(s) that device 300 allows DA 200 to move and/or copy as candidates for the correct graphical element 304. The identified graphical element(s) can thus vary according to the types of graphical elements device 300 allows DA 200 to move or copy. For example, in FIG. 3A, device 300 identifies graphical elements 304-314 because device 300 allows DA 200 to move and/or copy graphical elements 304-314. Device 300 does not identify other displayed graphical elements (e.g., a current time indicator, a battery status indicator, the desktop background) because device 300 does not allow DA 200 to move and/or copy the other displayed graphical elements.

In some examples, DA 200 determines and/or adjusts, based on user interaction data, a respective relevance score of each graphical element of the set of graphical elements. User interaction data can indicate various types of user interactions with a graphical element. In some examples, a user interaction with a graphical element includes a user interaction with the data represented by the graphical element. For example, user interaction data can indicate user gaze at the graphical element, a user gesture (e.g., tap gesture, pointing gesture) selecting the graphical element, a user click on the graphical element, user input to move the graphical element (e.g., to move the display location of the graphical element, to change the file location(s) of the represented data), user input to copy the graphical element (e.g., to copy the graphical element to another display location, to associate the represented data with another file location), user input to edit the graphical element (e.g., edit the represented data), and/or user input to cause display of the graphical element (or to cause display of the represented data). In some examples, DA 200 uses similar user interaction data (discussed below) to determine the display location where to copy graphical element 304, e.g., determine that the deictic reference "there" refers to a particular display location.

DA 200 further determines that the deictic reference refers to the graphical element (e.g., graphical element 304) with the highest relevance score of the respective relevance scores. In some examples, DA 200 scores the graphical elements in accordance with determining a user intent to copy or move a graphical element. In some examples, DA 200 scores the graphical elements as a background process, e.g., regardless of whether DA 200 receives natural language input and/or whether DA 200 invokes. For example, while display 302 displays graphical elements, DA 200 identifies a set of the displayed graphical elements corresponding to the copy or move action and determines/updates their respective relevance scores based on user interaction data. In accordance with determining a user intent to copy or move a graphical element, DA 200 selects the graphical element with the current highest relevance score as the one the deictic reference refers to.

In some examples, DA 200 decreases each of the respective relevance scores over time, e.g., using copy module 208. For example, as described in detail below, when device 300 detects a user interaction with a graphical element, DA 200 increases the relevance score of the graphical element due to the user interaction. However, if device 300 detects no further user interaction with the graphical element (e.g., via the user interaction data), DA 200 decreases the relevance score over time. Accordingly, in some examples, DA 200 determines that the deictic reference more likely refers to more recently interacted with graphical elements than to less recently interacted with graphical elements.

In some examples, the user interaction data includes user gaze input (e.g., detected by image sensor(s) 108) and DA 200 determines that the deictic reference refers to a graphical element by determining, based on the user gaze input, that a user gaze is directed to the graphical element. In some examples, the user gaze input is detected in response to invoking DA 200 or detected at a start time of the natural language input. In some examples, the user gaze input is detected at a time corresponding to the time (recognition time) when DA 200 recognizes the deictic reference (e.g., using STT processing module 202), e.g., within a predetermined duration before and/or after the recognition time and/or at the recognition time. In this manner, DA 200 can determine that "this" refers to graphical element 304 based on detecting user gaze at graphical element 304 around when the user says "this."

In some examples, DA 200 increases the relevance score of a graphical element based on detecting that user gaze is directed to the graphical element, e.g., at any of the above described times. For example, DA 200 increases the relevance score of graphical element 304 because the user gazes at graphical element 304 at the current time (e.g., a start time of the natural language input). The relevance scores of previously gazed at graphical elements may be lower than the relevance score of graphical element 304. For example, if the user previously gazed at graphical element 312 at a previous time, DA 200 increased the relevance score of graphical element 312 at the previous time. However, at the current time, DA 200 has decreased the relevance score of graphical element 312 to be lower than the relevance score of graphical element 304, e.g., because no user gaze at graphical element 312 was detected between the previous time and the current time.

In some examples, the user interaction data includes user gesture input (e.g., detected by image sensor(s) 108 and/or touch sensitive surface(s) 122) and DA 200 determines that the deictic reference refers to a graphical element based on the user gesture input. Example user gestures include tap gestures selecting the graphical element, pointing gestures at the graphical element, and other gestures selecting the graphical element, e.g., a gesture to circle the graphical element. In some examples, DA 200 determines that the deictic reference refers to the graphical element based on determining that the user gesture input selects the graphical element at a time corresponding to the recognition time of the deictic reference, e.g., within a predetermined duration before and/or after the recognition time and/or at the recognition time. In some examples, DA determines that the deictic reference refers to the graphical element based on determining that the user gesture input selects the graphical element when DA 200 is invoked or at a start time of the natural language input. In this manner, DA 200 can determine that "this" refers to graphical element 304 by detecting a user gesture selecting graphical element 304 around when the user says "this."

In some examples, DA 200 increases the relevance score of a graphical element based on detecting a user gesture input selecting the graphical element, e.g., at any of the above described times. For example, DA 200 increases the relevance score of graphical element 304 because a user gesture selects graphical element 304 around the recognition time of "this." The relevance score of graphical element 304 may be higher than the relevance scores of other graphical elements, e.g., because the other graphical elements were less recently selected via gesture input and thus have lower relevance scores.

In some examples, the user interaction data indicates the recency of user interaction with a graphical element. In some examples, DA 200 thus determines that the deictic reference refers to a graphical element by determining a recency of user interaction with the graphical element. For example, DA 200 assigns a graphical element more recently interacted with a higher relevance score than a graphical element less recently interacted with. As another example, DA 200 implicitly determines higher relevance scores for more recently interacted with graphical elements, e.g., due to decreasing a relevance score over time if device 300 detects no subsequent user interaction with the respective graphical element. As a specific example, when a user provides input to cause initial display of a graphical element, DA 200 determines a high relevance score for the graphical element. However, DA 200 decreases the relevance score over time, so more recently displayed graphical elements have higher relevance scores.

In some examples, the user interaction data indicates a frequency of user interaction with graphical elements of different types (e.g., representing different data types). In some examples, DA 200 thus determines that the deictic reference refers to a graphical element by determining a frequency of user interaction with graphical elements of a same type as the graphical element. For example, DA 200 counts the number of user interactions with graphical elements of different types (e.g., photos, presentations, word processing documents, videos) and determines higher relevance scores for graphical elements of types the user more frequently interacts with. For example, DA 200 determines that graphical element 304 has a higher relevance score than graphical element 312 because the user more frequently interacts with photos than with videos using device 300.

Figure 3B:
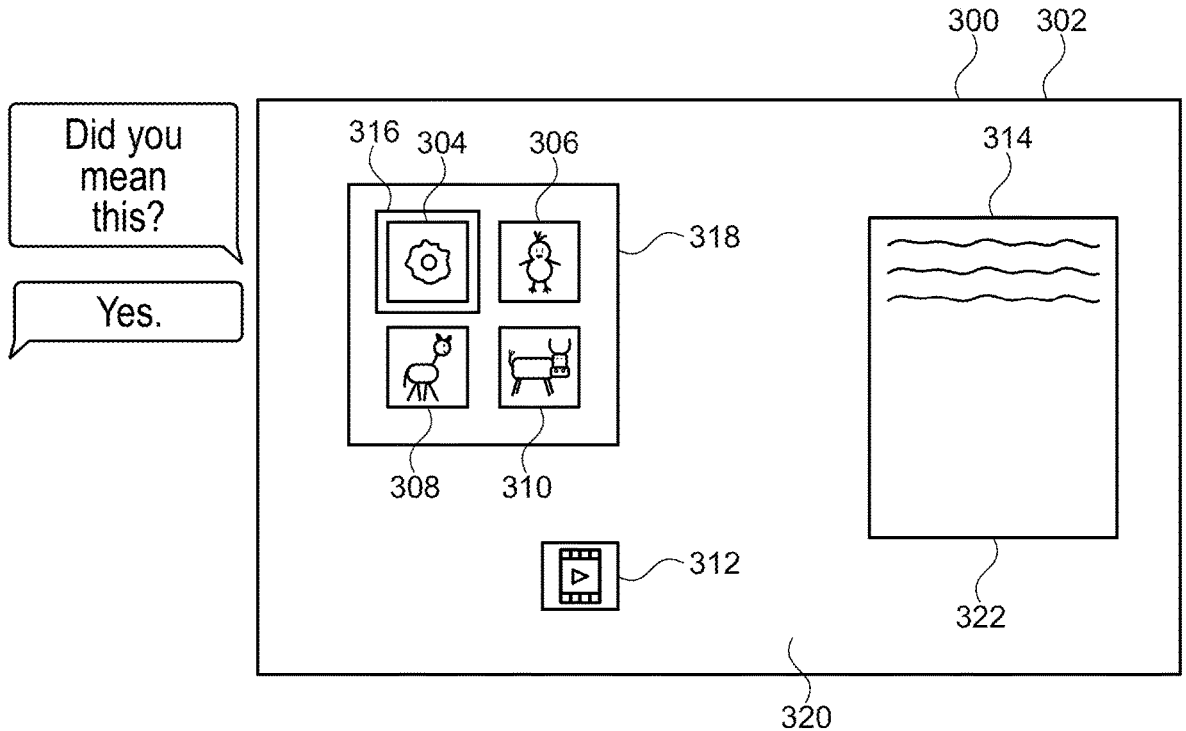

Turning to FIG. 3B, in some examples, DA 200 provides an output indicative of a request for user confirmation that the deictic reference refers to a graphical element. In some examples, the output includes speech output and concurrent output visually indicating the graphical element. Example output visually indicating the graphical element includes a modification to the graphical element's display manner (e.g., different border style, different size, different color, different font size, moving (e.g., jiggling) the display of the graphical element, highlighting the graphical element) and/or additional displayed output indicating the graphical element (e.g., an arrow pointing at the graphical element, a box or circle surrounding the graphical element). For example, in FIG. 3B, DA 200 provides the speech output "did you mean this?" while visually indicating graphical element 304 via display of graphical element 316.

In some examples, DA 200 provides the output indicative of the request for user confirmation in accordance with determining that the relevance score of the graphical element is below a threshold. For example, if DA 200 determines that graphical element 304 has the highest relevance score, but that the relevance score is below a threshold, DA 200 provides the output. In some examples, in accordance with determining that the relevance score of the graphical element is above the threshold, DA 200 forgoes providing the output. In some examples, in accordance with determining that each of the relevance scores (e.g., of graphical elements 304-314) is below a second threshold, DA 200 provides an output indicative of an error, e.g., "sorry, I don't know what you want to copy."

In some examples, after providing the output indicative of the request for user confirmation, DA 200 receives a user input confirming that the deictic reference refers to the graphical element. For example, in FIG. 3B, responsive to DA 200 asking "did you mean this?" the user provides the speech input "yes," thereby confirming that "this" in the natural language input refers to graphical element 304.

In some examples, in accordance with a determination that the deictic reference refers to a graphical element, DA 200 visually indicates the graphical element, e.g., without providing the output indicative of the request for user confirmation. For example, once DA 200 determines that "this" refers to graphical element 304, DA 200 displays graphical element 316 to visually indicate graphical element 304 without asking "did you mean this?". In this manner, a user can visually confirm whether DA 200 determined the correct graphical element to move or copy.

In some examples, the natural language input includes a second deictic reference to the target location (e.g., a display location) where a graphical element is to be moved or copied. Example second deictic references to the target location include "there," "here," "this location," "this place," and the like. In some examples, DA 200 determines the target location based on the second deictic reference according to the techniques discussed below. Accordingly, users are not required to explicitly specify the target location, thereby allowing users to easily and efficiently specify target locations to move and/or copy graphical elements.

In some examples, DA 200 determines the correct target location using techniques consistent with those used to determine the correct graphical element, e.g., referred to by "this." For example, in accordance with determining a user intent to move or copy a graphical element, DA 200 identifies a set of target locations displayed while the natural language input is received. Each target location of the set of target locations has the same type, e.g., target locations where graphical elements can be moved and/or copied to. For example, in FIG. 3B, DA 200 identifies target locations 318 (the user interface of the photos application), 320 (device 300's desktop), and 322 (the body of the word processing document) as the set of target locations.

DA 200 further determines and/or adjusts respective relevance scores of each target location of the set of target locations and selects the target location with the highest relevance score. In some examples, DA 200 determines and/or adjusts respective relevance scores of each target location as a background process (e.g., regardless of whether DA 200 receives natural language input or invokes) and in accordance with determining a user intent to move or copy a graphical element, DA 200 selects the target location with the current highest relevance score.

In some examples, DA 200 determines and/or adjusts the respective relevance scores of the target locations based on user interaction data indicating user interactions with target locations. The user interactions with target locations are similar to the user interactions with graphical elements discussed above. Example user interactions with a target location include a user gaze at the target location, a user gesture selecting the target location, other user inputs selecting a target location (e.g., to modify the display of the target locations (e.g., by adding graphical elements to or removing graphical elements from the target location), to move the target location, to click on the target location), and a user input causing initial display of the target location.

In some examples, similar to that discussed above, DA 200 increases the relevance score of a target location when device 300 detects a user interaction with the target location and decreases the relevance score over time if device 300 detects no further user interactions with the target location. Accordingly, DA 200 can determine higher relevance scores for more recently interacted with target locations. In some examples, DA 200 determines higher relevance scores for types of target locations more frequently interacted with. For example, DA 200 determines that the user more frequently interacts with (e.g., edits) word processing documents than the user interacts with (e.g., adds photos to) the user interface of the photos application. Accordingly, DA 200 determines that target location 322 has a higher relevance score than target location 318.

In some examples, the user interaction data includes user gaze input and determining the target location includes determining, based on the user gaze input, that a user gaze is directed to the target location. In some examples, the user gaze input is detected at a time corresponding to the time (second recognition time) when DA 200 recognizes the second deictic reference (e.g., using STT processing module 202), e.g., within a predetermined duration before and/or after the second recognition time and/or at the second recognition time. In this manner, DA 200 can determine that "there" refers to display location 322 (e.g., by increasing a relevance score of display location 322) based on determining that the user gazes at display location 322 around when the user says "there."

In some examples, the user interaction data includes user gesture input and determining the target location includes determining that the user gesture input selects the target location. In some examples, determining that the user gesture input selects the target location includes determining that the user gesture input selects the target location at a time corresponding to the second recognition time, e.g., within a predetermined duration before and/or after the second recognition time and/or at the second recognition time. In this manner, DA 200 can determine that "there" refers to display location 322 based on determining that the user gestures at (e.g., points at) display location 322 around when the user says "there."

Figure 3C:
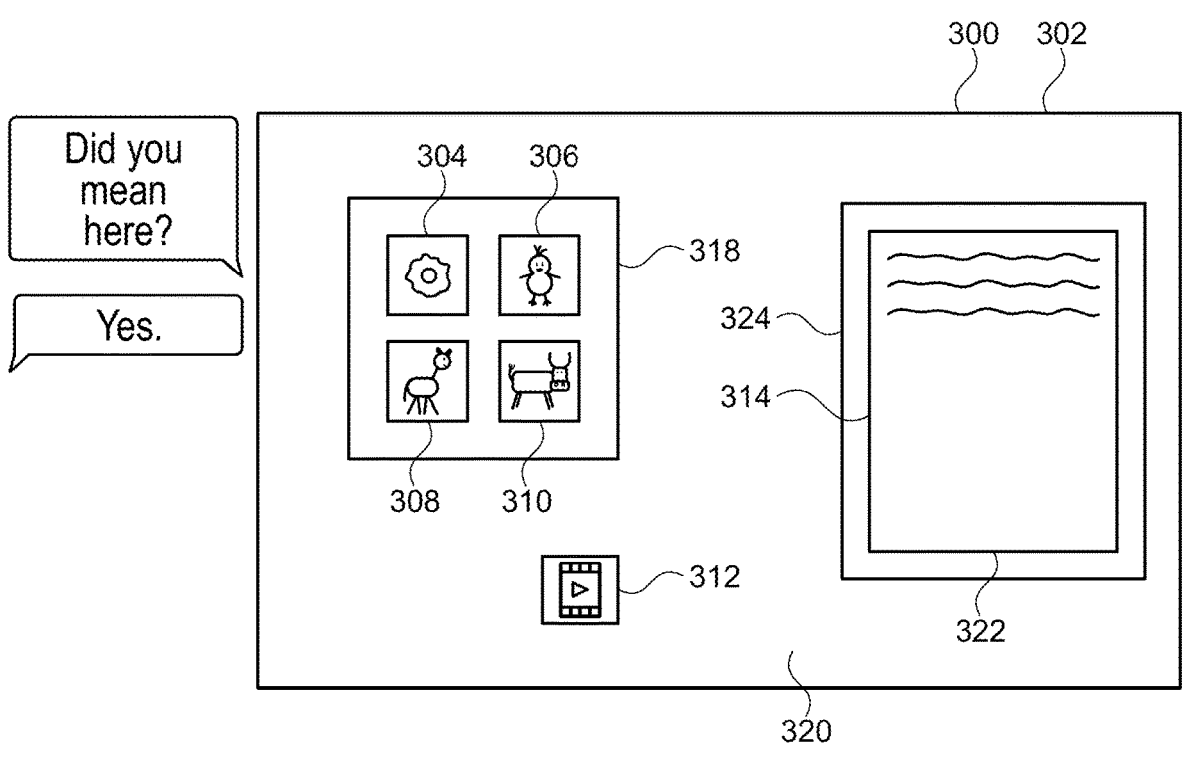

Turning to FIG. 3C, in some examples, DA 200 provides output indicative of a request for user confirmation that the second deictic reference refers to the determined target location. In some examples, the output includes speech output and concurrent output visually indicating the target location. Output visually indicating the target location is similar to output visually indicating a graphical element discussed above, e.g., a modification to the target location's display manner and/or additional displayed output indicating the target location. For example, in FIG. 3C, DA 200 provides the audio output "did you mean here?" while displaying graphical element 324 to visually indicate target location 322.

In some examples, DA 200 provides the output indicative of the request for user confirmation in accordance with determining that the relevance score of the target location is below a threshold. In some examples, in accordance with determining that the relevance score of the target location is above the threshold, DA 200 forgoes providing the output indicative of the request for user confirmation. In some examples, in accordance with determining that each relevance score of each identified target location is below a second threshold, DA 200 provides an output indicative of an error. For example, if the user gazes at a location different from identified target locations 318, 320, and 322 in FIG. 3B when they say "there", the relevance scores of identified target locations 318, 320, and 322 may each be low. Accordingly DA 200 outputs "sorry, I can't do that" or "I don't know where you want to copy that."

In FIG. 3C, DA 200 receives a user input confirming that the second deictic reference refers to the target location. For example, in FIG. 3C, responsive to DA 200 asking "did you mean here?", the user provides the speech input "yes," thereby confirming that "there" in the natural language input refers to target location 322.

In some examples, in accordance with determining the target location, DA 200 visually indicates the target location, e.g., without providing the output indicative of the request for user confirmation. For example, once DA 200 determines that "there" refers to target location 322, DA 200 displays graphical element 324 to visually indicate target location 322 without asking "did you mean here?". In this manner, a user can visually confirm whether DA 200 determined the correct target location to move or copy a graphical element.

Figure 3D:
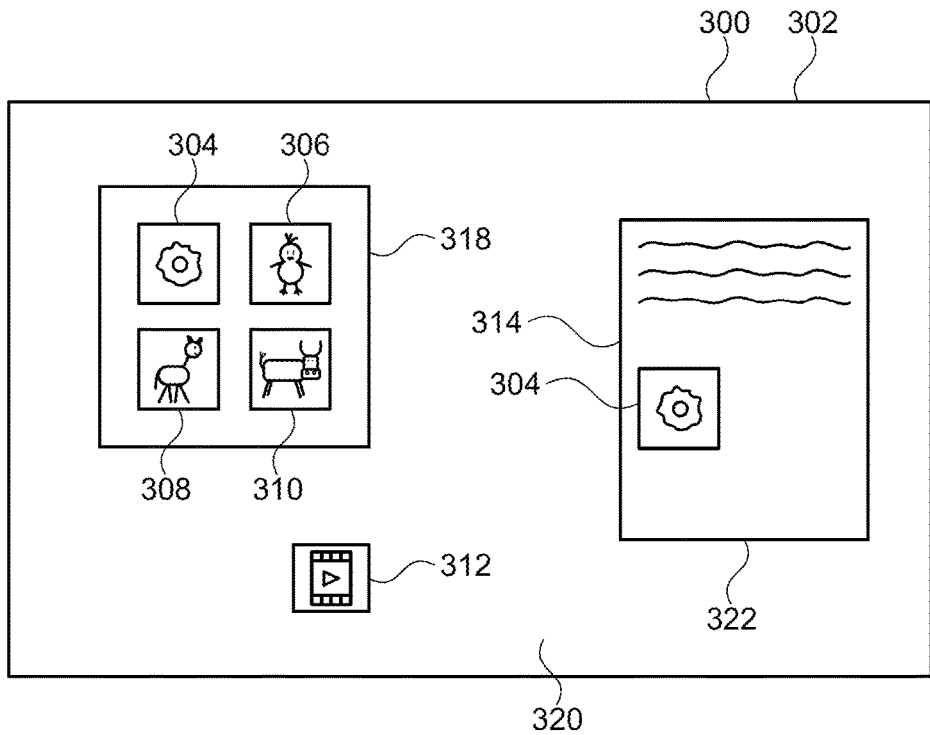

Turning to FIG. 3D, in accordance with determining that the deictic reference (e.g., "this") refers to a graphical element, DA 200 causes display 302 to display the graphical element at (e.g., within) the target location. In some examples, displaying the graphical element at the target location is performed in accordance with receiving user input confirming that the deictic reference refers to the graphical element (e.g., "yes" in FIG. 3B) and/or receiving user input confirming that the second deictic reference refers to the target location (e.g., "yes" in FIG. 3C). For example, in FIG. 3D, after the user responds "yes" and "yes" in FIGS. 3B and 3C, display 302 displays graphical element 304 at target location 322, e.g., displays the photo in the body of the word processing document. In the present example, because the natural language input (e.g., "copy this over there") corresponds to a copy user intent, when display 302 displays graphical element 304 at target location 322, graphical element 304 remains displayed at its original display location, e.g., in the user interface of the photos application. In other examples, if the natural language input corresponds to a move user intent (e.g., "move this over there"), when display 302 displays graphical element 304 at target location 322, display 302 ceases to display graphical element 304 at its original display location.

While the present example describes displaying graphical element 304 at target location 322 (e.g., the body of the document), in some examples, DA 200 determines a more precise target location to display a graphical element, e.g., a particular location in the body of the document. For example, consistent with the techniques above, DA 200 can identify multiple locations within the document as potential target locations, score the target locations, and select the target location with the highest relevance score. In this manner, if a user gazes and/or gestures at a particular display location in the document when saying "there," DA 200 can cause display of graphical element 304 at the particular display location.

In some examples, the target location specifies a file location (e.g., represented by a path) and displaying a graphical element at the target location includes associating the data represented by the graphical element with (e.g., saving the represented data at) the file location. For example, target location 322 specifies the file location of the word processing document. Thus, by displaying graphical element 304 at target location 322, DA 200 associates the represented photo with the file location of the word processing document, e.g., by saving the photo in the word processing document. As another example, suppose the user requests DA 200 to move graphical element 304 to target location 320 (device 300's desktop). DA 200 causes display of graphical element 304 at target location 320, thereby associating the represented photo with the file location specified by device 300's desktop, e.g., by saving the photo to device 300's desktop.

In some examples, the target location corresponds to a directory and displaying a graphical element at the target location includes associating the graphical element (e.g., the data represented by the graphical element) with the directory. For example, target location 322 corresponds to a directory (e.g., folder) including the word processing document and by displaying graphical element 304 in the word processing document, DA 200 associates the represented photo with the directory.

In some examples, the target location corresponds to an application of device 300 different from the application corresponding to the original display location. For example, the original display location of graphical element 304 corresponds to a photo application while target location 322 corresponds to a word processing application.

In some examples, if the graphical element directly displays the represented data at the original display location (e.g., as opposed to including an icon corresponding to the represented data), the graphical element, when displayed at the target location, similarly directly displays the represented data. For example, in FIG. 3D, graphical element 304 directly displays the photo at target location 322. In other examples, if the graphical element directly displays the represented data at the original display location, the graphical element, when displayed at the target location, does not directly display the represented data. For example, suppose the user requested to copy graphical element 314 (representing the word processing document) to target location 320 (device 300's desktop). When display 302 displays graphical element 314 at target location 320, graphical element 314 changes to include an icon (e.g., document icon) representing the word processing document.

In some examples, if a graphical element does not directly display the represented data at the original display location (e.g., includes an icon corresponding to the represented data), the graphical element, when displayed at the target location, similarly does not directly display the represented data. For example, if DA 200 instead copies graphical element 312 to target location 322, graphical element 312 similarly does not directly display the video when displayed at target location 322 (and instead includes an icon representing the video). In other examples, if a graphical element does not directly display the represented data at the original display location, the graphical element, when displayed at the target location, directly displays the represented data. For example, if DA 200 copies graphical element 312 to target location 322, graphical element 312 changes to include a display of the video (e.g., to play the video) when displayed at target location 322. Whether a graphical element directly displays the represented data at the target location can vary based on whether the target location supports direct display of the represented data.

In some examples, causing display of a graphical element at the target location includes executing two separate task flows. For example, in accordance with determining that the deictic reference refers to the graphical element, DA 200 executes a first task flow (e.g., a copy task flow) to obtain the data represented by the graphical element. For example, DA 200 executes the copy task flow to obtain data of the photo represented by graphical element 304. After executing the first task flow (and in accordance with determining the target location), DA 200 executes a second task flow (e.g., a paste task flow) using the obtained data and the target location to display the graphical element at the target location. For example, after DA 200 executes the copy task flow, DA 200 executes, using parameters of the obtained data and determined target location 322, the paste task flow to display graphical element 304 at target location 322.

Figure 3E:
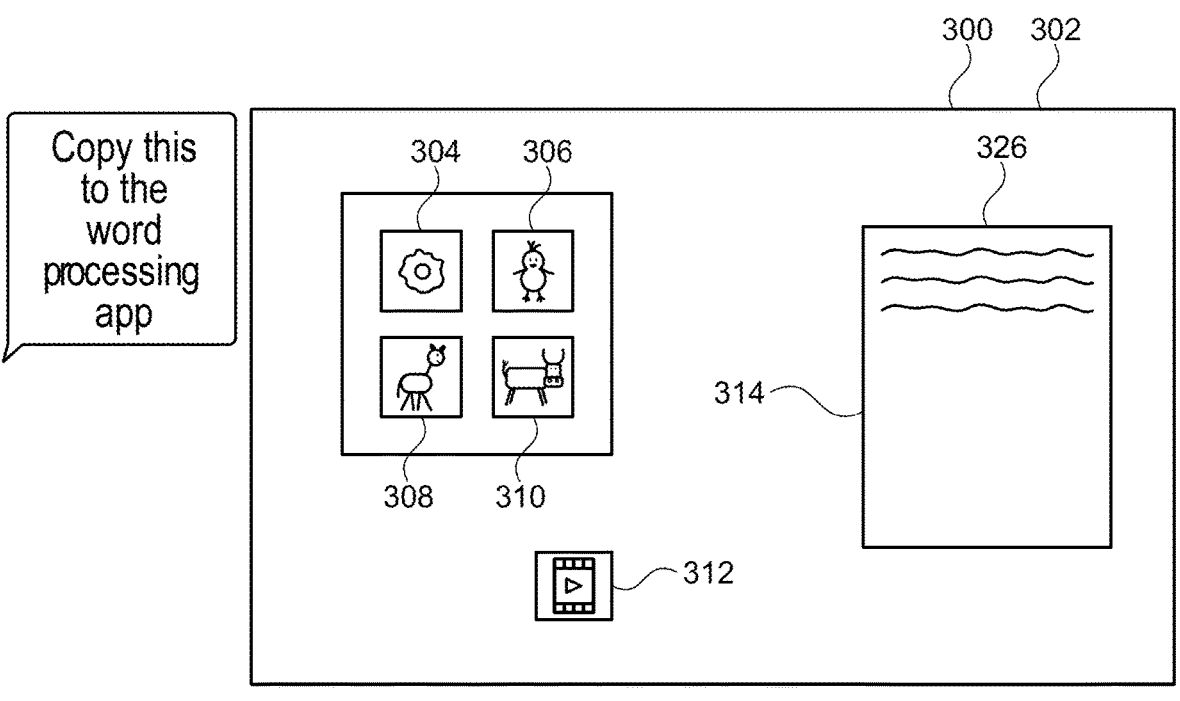

Turning to FIG. 3E, in some examples, a natural language input specifies an application corresponding to the target location. For example, in FIG. 3E, the user asks DA 200 to "copy this to the word processing application" while display 302 displays user interface 326 of the word processing application. Other example applications corresponding to target locations include a photos application, a file management application, a calendar application, a notes application, a desktop, a messaging application, an internet browsing application, web applications (e.g., web based-email providers, web based chat providers), and the like.

In the example of FIG. 3E, according to the above discussed techniques, DA 200 determines that "this" in the natural language input refers to graphical element 304. DA 200 further determines the target location based on the specified application. For example, DA 200 determines that the target location corresponds to (e.g., is included in) a user interface of the specified application displayed when the natural language input is received. If display 302 displays multiple user interfaces of the specified application when the natural language input is received (e.g., displays multiple word processing documents), DA 200 determines that the target location corresponds to the user interface displayed in the foreground when the natural language input is received, or to the user interface most recently interacted with. In some examples, DA 200 alternatively or additionally determines the target location according to the above discussed techniques, e.g., based on user interaction with the target location.

Figure 3F:
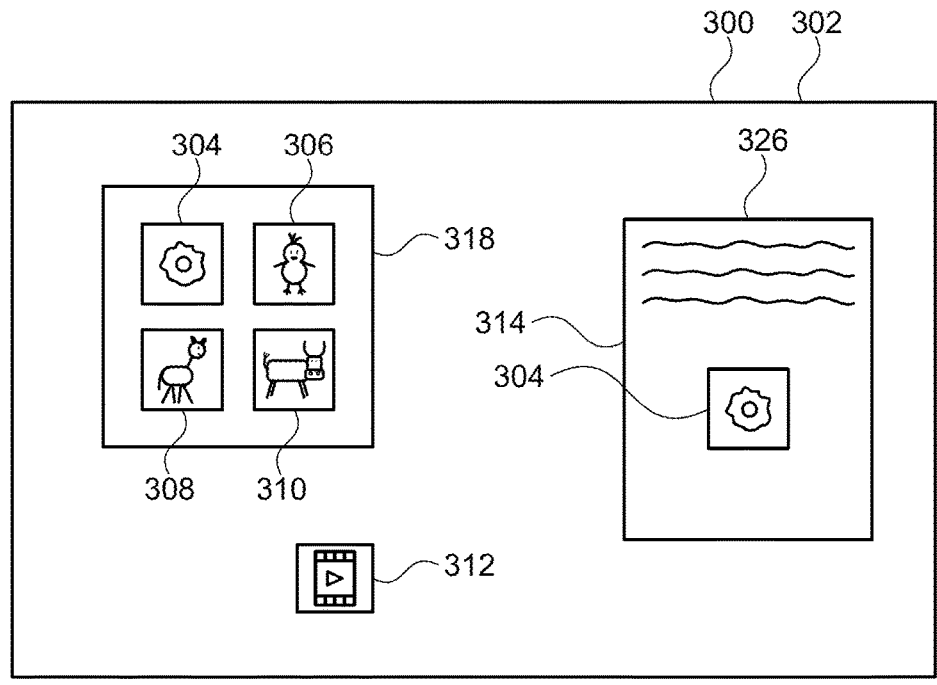

In FIG. 3F, based on the natural language input "copy this to the word processing application," DA 200 determines that user interface 326 of the word processing application corresponds to the target location. DA 200 thus causes display 302 to display graphical element 304 at the target location, e.g., within user interface 326.

Figure 3G:
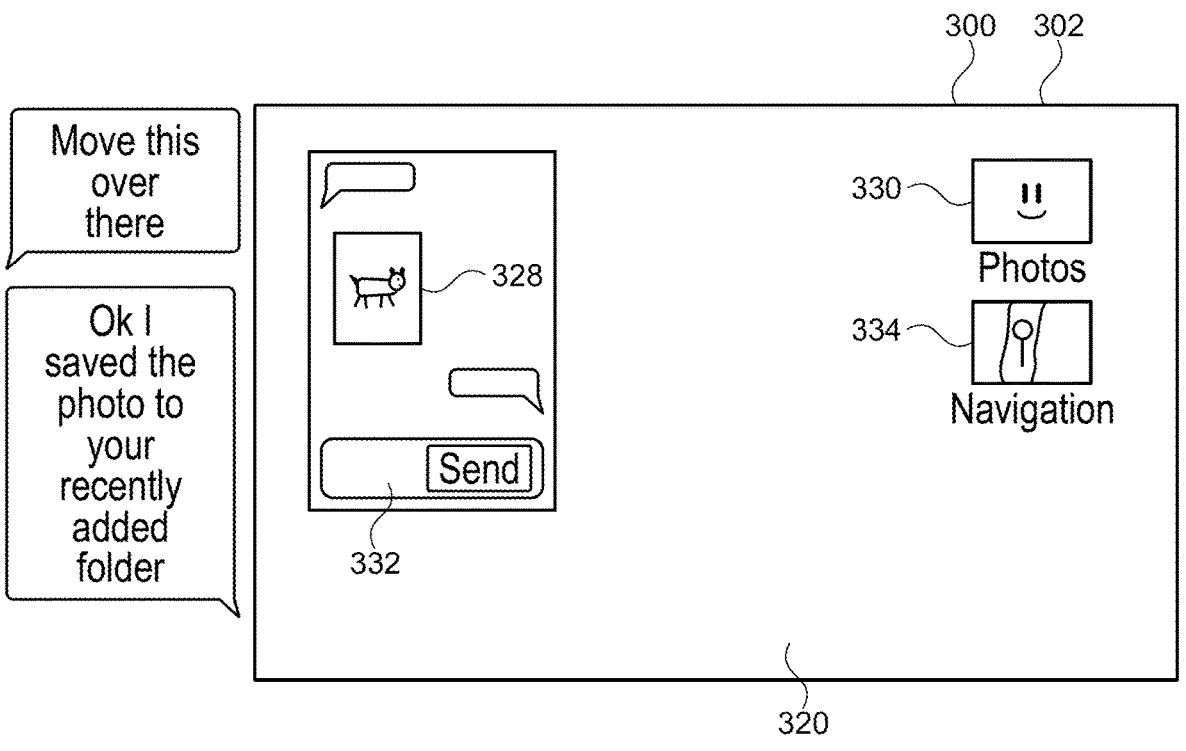
Figure 3H:
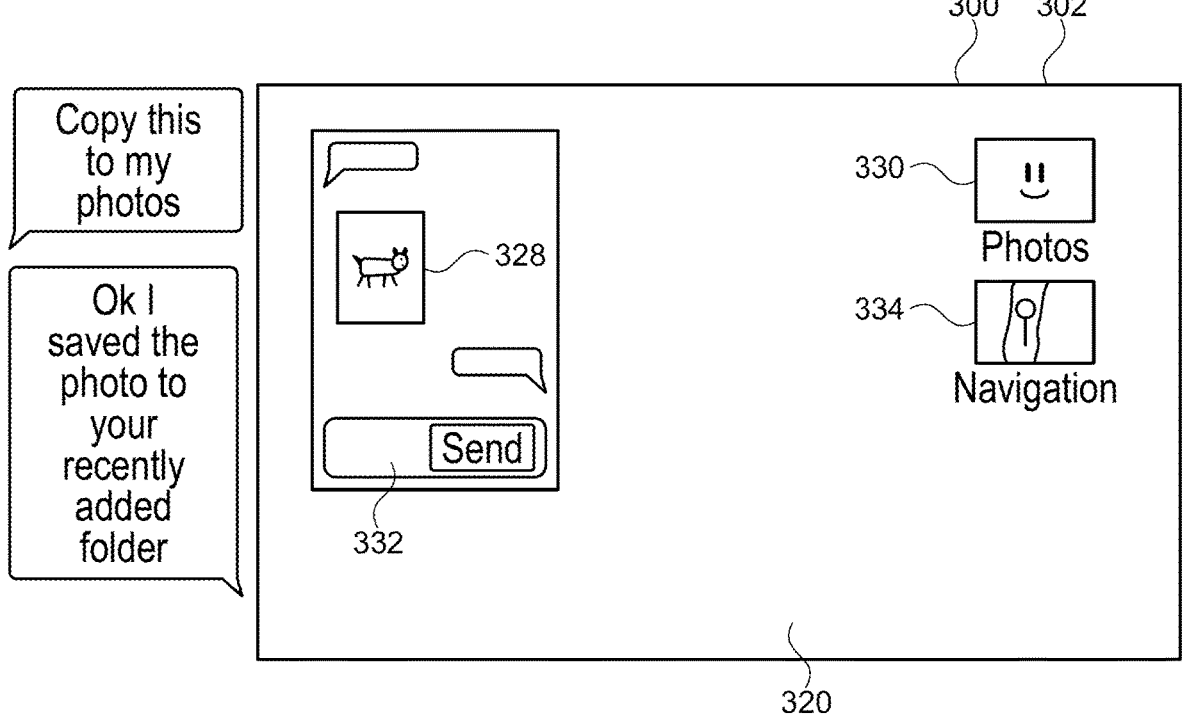

Turning to FIGS. 3G-3H, in some examples, DA 200 associates a graphical element (e.g., associates the data represented by the graphical element) with a target location without a corresponding displayed user interface. Accordingly, in some examples, the target location describes a file location (e.g., represented by a path) instead of a display location. For example, in FIG. 3G, the user asks DA 200 to "copy this over there," to cause DA 200 to associate the photo data represented by graphical element 328 with a file location corresponding to the photos application. Notably, display 302 does not display a user interface corresponding to the file location when the natural language input is received. For example, display 302 displays icon 330 of the photos application, but does not display a user interface of the photos application, e.g., a user interface showing the user's photos.

Graphical element 328 has a location. In some examples, the location describes a display location of graphical element 328, e.g., displayed in a user interface of a messaging application of device 300. In some examples, the location describes a file location of the represented data, e.g., a location represented by a path to the user's message data. In some examples, the location corresponds to an application (e.g., a messaging application) and/or corresponds to a directory (e.g., a directory including the user's message data).

In FIG. 3G, while display 302 displays graphical element 328, DA 200 receives a natural language input including a deictic reference to graphical element 328. For example, the user speaks "move this over there." Responsive to the natural language input, DA 200 determines a target location and associates graphical element 328 with the target location according to the techniques discussed below.

DA 200 determines that the natural language input corresponds to a user intent to move or copy a graphical element and determines that the deictic reference refers to a particular graphical element according to the techniques discussed above. For example, DA 200 determines, based on user interaction data (e.g., user gaze at graphical element 328), that the deictic reference "this" refers to graphical element 328. In some examples, DA 200 further provides an output indicative of a request for user confirmation that the deictic reference refers to the graphical element and receives a user input confirming that the deictic reference refers to the graphical element, e.g., similar to that described with respect to FIG. 3B.

In some examples, the natural language input includes a second deictic reference (e.g., "there") to the target location. DA 200 determines the target location based on the second deictic reference. For example, DA 200 determines that the second deictic reference refers to a display location, e.g., as when a user speaks a second deictic reference (e.g., "here," "there," "this place"), the user likely refers to a display location. As discussed below, DA 200 then uses the display location to determine the target location to associate graphical element 328 with.

DA 200 determines that the second deictic reference refers to the display location consistent with the techniques discussed above. For example, in accordance with determining a user intent to move or copy a graphical element, DA 200 identifies a set of display locations displayed while the natural language input is received. Each display location of the set of display locations is compatible with the graphical element, e.g., display locations where the graphical element can be moved and/or copied to and displayed icon(s) of predetermined application(s) compatible with the data type of the graphical element. For example, device 300 specifies application(s) compatible with a data type (e.g., a photos application compatible with the photo data type, a navigation application compatible with a physical location data type, and the like). In the example of FIG. 3G, DA 200 identifies the display location of icon 330, display location 320 (e.g., device 300's desktop), and display location 332 (e.g., a message input field) as the set of display locations. DA 200 does not identify the display location of icon 334 of the navigation application as the navigation application is not compatible with the photo data type.

In some examples, DA 200 further scores, based on user interaction data, each display location of the set of display locations and determines that the second deictic reference refers to the highest scored display location. In FIG. 3G, DA 200 determines that the second deictic reference "there" refers to the display location of icon 330, e.g., based on user gaze at icon 330 around when the user says "there." In some examples, if DA 200 is unable to determine a display location referred-to by the second deictic reference (e.g., if the respective relevance score of each identified display location is below a threshold), DA 200 provides an output indicative of an error. For example, suppose the user gazes at icon 334 of the navigation application when they say "there." Because the user does not gaze at any of the identified display locations, the relevance scores of the identified display locations are each below the threshold. DA 200 thus provides the output "sorry, I can't do that," e.g., as device 300 does not allow photos to be copied to the navigation application.

In some examples, DA 200 further provides output indicative of a request for user confirmation that the second deictic reference refers to the display location and receives user input confirming that the second deictic reference refers to the display location, e.g., similar to that described with respect to FIG. 3C.

In some examples, in accordance with determining that the second reference refers to the display location, DA 200 determines whether the display location corresponds to a predetermined type. Predetermined types of display locations describe display locations where device 300 allows graphical elements to be copied and/or moved to, e.g., to be displayed at and/or within. In contrast, display locations not of the predetermined type (e.g., application icons) describe display locations where device 300 does not allow graphical elements to be copied and/or moved to. For example, in FIG. 3G, display locations 320 and 332 correspond to the predetermined type (e.g., as graphical elements can be copied and/or moved to the desktop and to the message input field) while the display location of icons 330 and 334 do not correspond to the predetermined type, e.g., as a graphical element cannot be displayed within icons 330 or 334.

In some examples, in accordance with a determination that the display location corresponds to the predetermined type, DA 200 determines the target location to be the file location specified by the display location. For example, if DA 200 determines that display location 320 is the referred-to display location, DA 200 determines the target location as the file location of device 300's desktop (e.g., represented by a path to device 300's desktop). In some examples, in accordance with a determination that the display location does not correspond to the predetermined type, DA 200 determines the target location to be a default file location corresponding to the display location. For example, if the display location is an application icon, the target location is a default location in the application. For example, in FIG. 3G, DA 200 determines that the display location of icon 330 does not correspond to the predetermined type, and thus determines the target location to be a default location in the photos application, e.g., a file location of a "recently added" folder of the photos application.

In some examples, in accordance with determining that the deictic reference refers to a graphical element, DA 200 causes the graphical element to be associated with the target location. For example, DA 200 causes the data represented by the graphical element to be associated with (e.g., saved at) the target location. In some examples, causing the graphical element to be associated with the target location is performed further in accordance with receiving user input confirming that the deictic reference refers to the graphical element and/or receiving user input confirming the display location (e.g., of icon 330). In the example of FIG. 3G, DA 200 causes the photo of graphical element 328 to be associated with the file location of the "recently added" folder, e.g., by saving the photo in the "recently added" folder.

In some examples, causing the graphical element to be associated with the target location includes providing output (e.g., audio input) indicating the association. For example, in FIG. 3G, DA 200 outputs "ok, I saved the photo to your recently added folder."

As shown in FIG. 3G, in some examples, a user interface corresponding to the target location is not displayed when the natural language input is received and when the graphical element is associated with the target location. For example, a user interface showing the "recently added" folder is not displayed when DA 200 saves the photo to the "recently added" folder. In contrast, in FIGS. 3A-3F above, a user interface corresponding to target location 322 (e.g., the body of the word processing document) is displayed when graphical element 304 is displayed at target location 322.

In some examples, causing a graphical element to be associated with a target location includes executing two separate task flows. For example, in accordance with a determination that the deictic reference refers to a graphical element, DA 200 executes a first task flow (e.g., a copy task flow) to obtain the data represented by graphical element. For example, DA 200 executes the copy task flow to obtain data of the photo represented by graphical element 328. In some examples, after executing the first task flow (and in accordance with determining the target location), DA 200 executes a second task flow (e.g., a paste task flow) using the obtained data and the target location to cause the graphical element to be associated with the target location. For example, DA 200 executes the paste task flow, using the parameters of the obtained data and the file location of the "recently added" folder, to save the photo in the "recently added" folder.

Turning to FIG. 3H, in some examples, a natural language input specifies an application corresponding to the target location. For example, in FIG. 3H, the user asks DA 200 to "copy this to my photos." DA 200 determines that the deictic reference "this" refers to graphical element 328. DA 200 further determines the target location based on the specified application.

For example, DA 200 determines whether a user interface corresponding to the application is displayed when the natural language input is received (e.g., as discussed with respect to FIG. 3E). If so, DA 200 determines the target location to be the file location specified by the user interface. For example, if display 302 displays a user interface corresponding to the "recently added" folder when DA 200 receives "copy this to my photos," DA 200 determines the target location to be the file location of the "recently added" folder. DA 200 thus associates graphical element 328 with the file location, e.g., by saving the photo to the "recently added" folder and displaying the photo in the user interface corresponding to the "recently added" folder.

If DA 200 determines that that a user interface corresponding to the application is not displayed when the natural language input is received, DA 200 determines the target location to be a default location corresponding to the application. For example, in FIG. 3H, DA 200 determines that no user interface corresponding to the photos application is displayed when the natural language input is received. DA

200 thus determines the target location to be a default location in the photos application (e.g., the file location of the "recently added" folder). DA 200 then associates graphical element 328 with the default location. In some examples, DA 200 further provides output (e.g., audio output) indicative of the association, e.g., "ok I saved the photo to your recently added folder."

Figure 4:
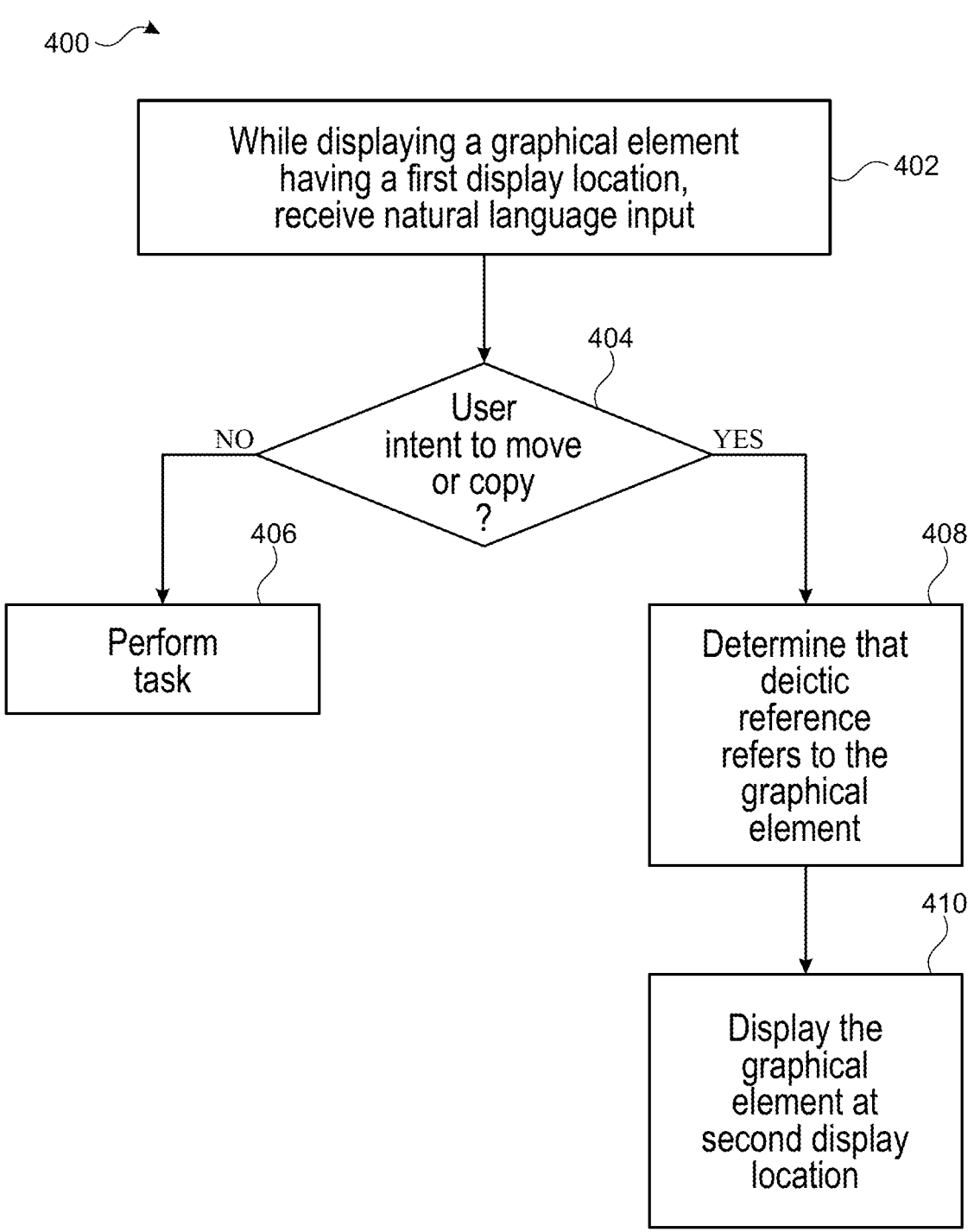
FIG. 4 illustrates a process for moving or copying items, according to various examples.

FIG. 4 illustrates process 400 for moving or copying items, according to various examples. Process 400 is performed, for example, at a device (e.g., device 300) and using DA 200 and system 100. In process 400, some operations are, optionally, combined, the orders of some operations are, optionally, changed, and some operations are, optionally, omitted. In some examples, additional operations are performed in combination with process 400.

At block 402, while displaying, on a display (e.g., display 302), a graphical element (e.g., graphical element 304) having a first display location, a natural language input including a deictic reference to the graphical element is received.

At block 404, it is determined (e.g., by DA 200) whether the natural language input corresponds to a user intent to move or copy the graphical element. In some examples, at block 406, in accordance with a determination that the natural language input does not correspond to a user intent to move or copy the graphical element, a task is performed (e.g., by DA 200) based on the natural language input.

At block 408, in accordance with a determination that the natural language input corresponds to the user intent to move or copy the graphical element, it is determined (e.g., by copy module 208), based on detected user gaze input, that the deictic reference refers to the graphical element. In some examples, determining that the deictic reference refers to the graphical element includes: identifying (e.g., by copy module 208) a first set of graphical elements displayed while the natural language input is received (e.g., graphical elements 304, 306, 308, 310, 312, and 314), where: each graphical element of the first set of graphical elements corresponds to a same predetermined type of action; and the first set of graphical elements includes the graphical element; determining (e.g., by copy module 208), based on user interaction data, a respective relevance score of each graphical element of the first set of graphical elements; and determining (e.g., by copy module 208) that the deictic reference refers to the graphical element in accordance with a determination that a relevance score of the graphical element is the highest relevance score of the respective relevance scores. In some examples, each of the respective relevance scores is decreased (e.g., by copy module 208) over time.

In some examples, determining that the deictic reference refers to the graphical element includes determining, based on the user gaze input, that a user gaze is directed to the graphical element. In some examples, input to invoke a digital assistant operating on the electronic device (e.g., DA 200) is received and in response to receiving the input to invoke the digital assistant, the digital assistant is invoked, where the user gaze input is detected in response to invoking the digital assistant.

In some examples, a user gesture input is detected. In some examples, determining that the deictic reference refers to the graphical element includes determining that the deictic reference refers to the graphical element based on the user gesture input. In some examples, determining that the deictic reference refers to the graphical element based on the user gesture input is performed in accordance with a determination that the user gesture input corresponds to a selection of the graphical element at a time corresponding to when the deictic reference is recognized by the electronic device.

In some examples, determining that the deictic reference refers to the graphical element includes determining a frequency of user interaction with graphical elements of a same type as the graphical element. In some examples, determining that the deictic reference refers to the graphical element includes determining a recency of user interaction with the graphical element.

In some examples, in accordance with determining that the deictic reference refers to the graphical element, the graphical element is visually indicated (e.g., via display of graphical element 316).

At block 410, in accordance with determining that the deictic reference refers to the graphical element, the graphical element is displayed at a second display location (e.g., target location 322) different from the first display location. In some examples, the first display location corresponds to a first directory and the second display location corresponds to a second directory. In some examples, displaying the graphical element at the second display location includes associating the graphical element with the second directory. In some examples, the first display location corresponds to a first application of the electronic device and the second display location corresponds to a different second application of the electronic device.

In some examples, displaying the graphical element at the second display location includes: in accordance with determining that the deictic reference refers to the graphical element: executing (e.g., by task flow processing module 206) a first task flow to obtain first data represented by the graphical element; and after executing the first task flow, executing (e.g., by task flow processing module 206) a second task flow using the first data and the second display location to display the graphical element at the second display location.

In some examples, a first output indicative of a request for user confirmation that the deictic reference refers to the graphical element is provided (e.g., via display of graphical element 316). In some examples, after providing the first output, a first user input confirming that the deictic reference refers to the graphical element is received, where displaying the graphical element at the second display location is performed in accordance with receiving the first user input.

In some examples, the natural language input includes a second deictic reference to the second display location. In some examples, the second display location is determined (e.g., by copy module 208) based on the second deictic reference, where displaying the graphical element at the second display location is performed in accordance with determining the second display location. In some examples, determining the second display location includes determining, based on user gaze input detected at a time corresponding to when the second deictic reference is recognized by the electronic device, that a second user gaze is directed to the second display location. In some examples, a second user gesture input is detected, where determining the second display location includes determining that the second user gesture input corresponds to a selection of the second display location at a second time corresponding to when the second deictic reference is recognized by the electronic device.

In some examples, a second output indicative of a request for user confirmation that the second deictic reference refers to the second display location is provided (e.g., via display of graphical element 324). In some examples, after providing the second output, a second user input confirming that the second deictic reference refers to the second display location is received, where displaying the graphical element at the second display location is performed in accordance with receiving the second user input.

In some examples, the natural language input specifies an application corresponding to the second display location, a user interface of the application (e.g., user interface 326) is displayed when the natural language input is received, and the second display location corresponds to the user interface of the application.

The operations discussed above with respect to FIG. 4 are optionally implemented by the components depicted in FIG. 2, e.g., by system 100 and DA 200.

Figure 5:
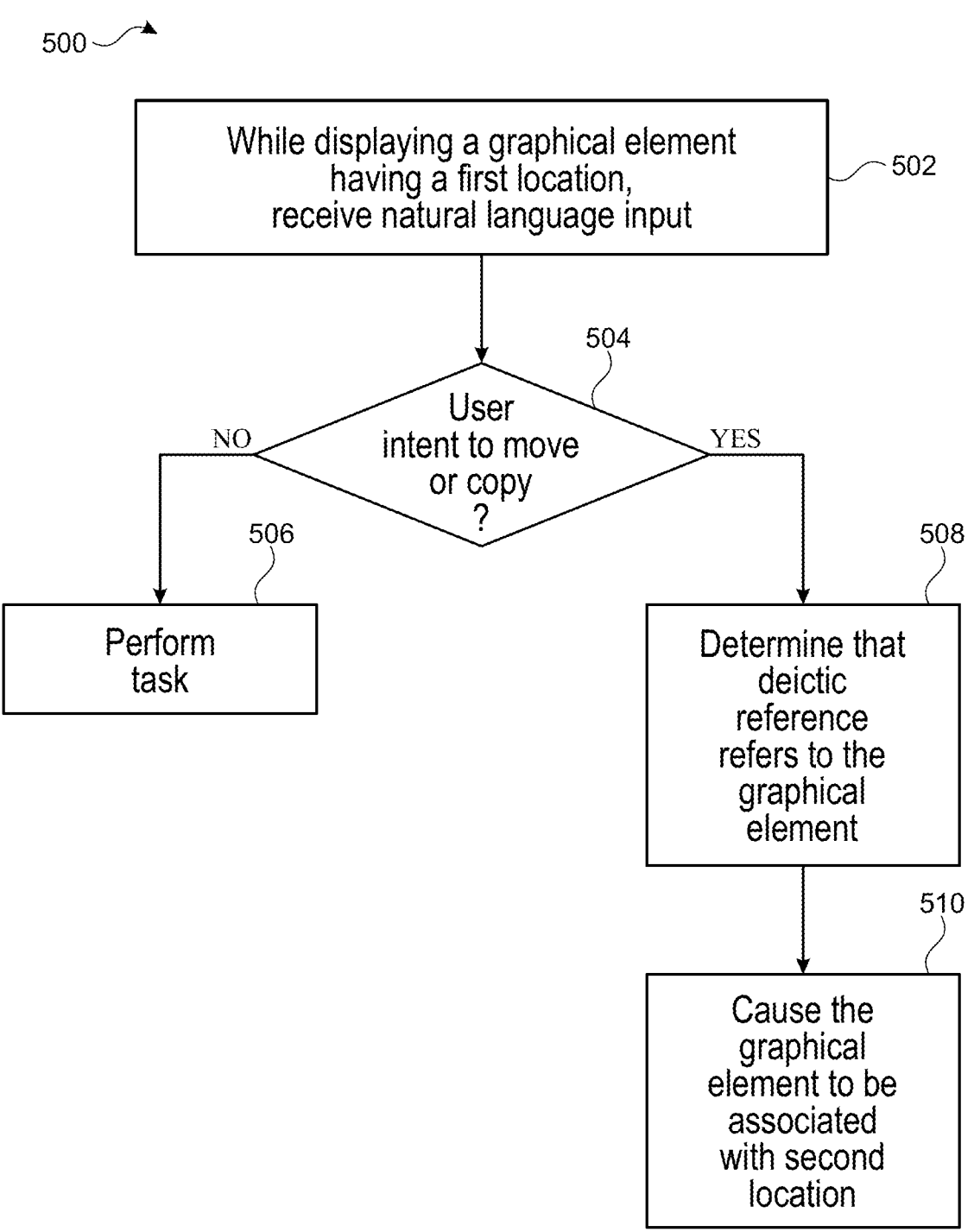
FIG. 5 illustrates a process for moving or copying items, according to various examples.

FIG. 5 illustrates process 500 for moving or copying items, according to various examples. Process 500 is performed, for example, at a device (e.g., device 300) and using DA 200 and system 100. In process 500, some operations are, optionally, combined, the orders of some operations are, optionally, changed, and some operations are, optionally, omitted. In some examples, additional operations are performed in combination with process 500.

At block 502, while displaying, on a display (e.g., display 302), a graphical element (e.g., graphical element 328) having a first location, a natural language input including a deictic reference to the graphical element is received.

At block 504, it is determined (e.g., by DA 200) whether the natural language input corresponds to a user intent to move or copy the graphical element. In some examples, at block 506, in accordance with a determination that the natural language input does not correspond to a user intent to move or copy the graphical element, a task is performed (e.g., by DA 200) based on the natural language input.

At block 508, in accordance with a determination that the natural language input corresponds to the user intent to move or copy the graphical element, it is determined (e.g., by copy module 208), based on detected user gaze input, that the deictic reference refers to the graphical element. In some examples, determining that the deictic reference refers to the graphical element includes: identifying (e.g., by copy module 208) a first set of graphical elements displayed while the natural language input is received, where each graphical element of the first set of graphical elements corresponds to a same predetermined type of action; and the first set of graphical elements includes the graphical element; determining (e.g., by copy module 208), based on user interaction data, a respective relevance score of each graphical element of the first set of graphical elements; and determining (e.g., by copy module 208) that the deictic reference refers to the graphical element in accordance with a determination that a relevance score of the graphical element is the highest relevance score of the respective relevance scores. In some examples, each of the respective relevance scores is decreased over time (e.g., by copy module 208).

In some examples, determining that the deictic reference refers to the graphical element includes determining, based on the user gaze input, that a user gaze is directed to the graphical element. In some examples, input to invoke a digital assistant operating on the electronic device (e.g., DA 200) is received. In some examples, in response to receiving the input to invoke the digital assistant, the digital assistant is invoked, where the user gaze input is detected in response to invoking the digital assistant.

In some examples, a user gesture input is detected. In some examples, determining that the deictic reference refers to the graphical element includes determining that the deictic reference refers to the graphical element based on the user gesture input. In some examples, determining that the deictic reference refers to the graphical element based on the user gesture input is performed in accordance with a determination that the user gesture input corresponds to a selection of the graphical element at a time corresponding to when the deictic reference is recognized by the electronic device.

In some examples, determining that the deictic reference refers to the graphical element includes determining a frequency of user interaction with graphical elements of a same type as the graphical element. In some examples, determining that the deictic reference refers to the graphical element includes determining a recency of user interaction with the graphical element.

In some examples, in accordance with determining that the deictic reference refers to the graphical element, the graphical element is visually indicated.

At block 510, in accordance with determining that the deictic reference refers to the graphical element, the graphical element is caused (e.g., by DA 200) to be associated with a second location different from the first location. In some examples, the first location corresponds to a first directory and the second location corresponds to a second directory. In some examples, causing the graphical element to be associated with the second location includes causing the graphical element to be associated with the second directory. In some examples, the first location corresponds to a first application of the electronic device and the second location corresponds to a different second application of the electronic device.

In some examples, a user interface corresponding to the second location is not displayed when the natural language input is received and when the graphical element is associated with the second location.

In some examples, causing the graphical element to be associated with the second location includes: in accordance with determining that the deictic reference refers to the graphical element: executing a first task flow (e.g., using task flow processing module 206) to obtain first data represented by the graphical element; and after executing the first task flow, executing a second task flow (e.g., using task flow processing module 206) using the first data and the second location to cause the graphical element to be associated with the second location.

In some examples, a first output indicative of a request for user confirmation that the deictic reference refers to the graphical element is provided. In some examples, after providing the first output, a first user input confirming that the deictic reference refers to the graphical element is received, where causing the graphical element to be associated with the second location is performed in accordance with receiving the first user input.

In some examples, the natural language input includes a second deictic reference to the second location. In some examples, the second location is determined (e.g., by copy module 208) based on the second deictic reference, where causing the graphical element to be associated with the second location is performed in accordance with determining the second location. In some examples, determining the second location includes: determining that the second deictic reference refers to a display location (e.g., the display location of icon 330); in accordance with a determination that the display location corresponds to a predetermined type: determining the second location to be a third location corresponding to the display location (e.g., a file location specified by the display location); and in accordance with a determination that the display location does not correspond to the predetermined type: determining the second location to be a fourth location (e.g., a default location) corresponding to the display location.

In some examples, determining that the second deictic reference refers to the display location includes: determining, based on user gaze input detected at a time corresponding to when the second deictic reference is recognized by the electronic device, that a second user gaze is directed to the display location. In some examples, a second user gesture input is detected. In some examples, determining that the second deictic reference refers to the display location includes determining that the second user gesture input corresponds to a selection of the display location at a second time corresponding to when the second deictic reference is recognized by the electronic device.

In some examples, a second output indicative of a request for user confirmation that the second deictic reference refers to the display location is provided. In some examples, after providing the second output, a second user input confirming that the second deictic reference refers to the display location is received, where causing the graphical element to be associated with the second location is performed in accordance with receiving the second user input.

In some examples, the natural language input specifies an application corresponding to the second location. In some examples, the second location is a default location corresponding to the application.

The operations discussed above with respect to FIG. 5 are optionally implemented by the components depicted in FIG. 2, e.g., by system 100 and DA 200.

In some examples, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In some examples, an electronic device is provided that comprises means for performing any of the methods or processes described herein.

In some examples, an electronic device is provided that comprises a processing unit configured to perform any of the methods or processes described herein.

In some examples, an electronic device is provided that comprises one or more processors and memory storing one or more programs for execution by the one or more processors, the one or more programs including instructions for performing any of the methods or processes described herein.

As described above, one aspect of the present technology is the gathering and use of data available from various sources to move or copy items between locations. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to efficiently move or copy items. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of using gaze data to move or copy items, the present technology can be configured to allow users to select to "opt in" or "opt out" of participation in the collection of personal information data during registration for services or anytime thereafter. In another example, users can select not to provide gaze data otherwise used to move or copy items. In yet another example, users can select to limit the length of time gaze data is maintained or entirely prohibit the collection of gaze data, e.g., for any purpose. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, items can be moved or copied based on non-personal information data or a bare minimum amount of personal information, such as the location where the item is to be moved or copied, other non-personal information available to the system, or publicly available information.

What is claimed is:

1. A non-transitory computer-readable storage medium storing one or more programs, the one or more programs comprising instructions, which when executed by one or more processors of an electronic device having a display, cause the electronic device to:

while displaying, on the display, a graphical element having a first display location:

receive input to invoke a digital assistant operating on the electronic device; and receive a natural language input including a first deictic reference to the graphical element and a second deictic reference to a second display location, wherein the natural language input corresponds to a user intent to move or copy the graphical element;

in response to receiving the input to invoke the digital assistant, invoke the digital assistant, wherein user gaze input is detected in response to invoking the digital assistant;

determine the natural language input corresponds to the user intent to move or copy the graphical element; and in accordance with the determination that the natural language input corresponds to the user intent to move or copy the graphical element:

determine, based on the detected user gaze input, that the first deictic reference refers to the graphical element, including:

determining a first time when the first deictic reference is recognized;

determining, based on the first time, a first predetermined time window around the first time; and determining that a first user gaze is directed to the graphical element at a second time that is within the first predetermined time window around the first time;

determine that the second deictic reference refers to the second display location, wherein determining that the second deictic reference refers to the second display location includes:

determining a third time when the second deictic reference is recognized, wherein the third time is different from the first time;

determining, based on the third time, a second predetermined time window around the third time; and determining that a second user gaze is directed to the second display location at a fourth time that is within the second predetermined time window around the third time; and in accordance with a determination that a first set of one or more criteria is satisfied, display the graphical element at the second display location different from the first display location, wherein the first set of one or more criteria includes:

a first criterion that is satisfied when the first deictic reference is determined to refer to the graphical element; and a second criterion that is satisfied when the second deictic reference is determined to refer to the second display location.

2. The non-transitory computer-readable storage medium of claim 1, wherein the first display location corresponds to a first directory and the second display location corresponds to a second directory, and wherein displaying the graphical element at the second display location includes associating the graphical element with the second directory.

3. The non-transitory computer-readable storage medium of claim 1, wherein the first display location corresponds to a first application of the electronic device and the second display location corresponds to a different second application of the electronic device.

4. The non-transitory computer-readable storage medium of claim 1, wherein determining that the first deictic reference refers to the graphical element includes:

identifying a first set of graphical elements displayed while the natural language input is received, wherein:

each graphical element of the first set of graphical elements corresponds to a same predetermined type of action; and the first set of graphical elements includes the graphical element;

determining, based on user interaction data, a respective relevance score of each graphical element of the first set of graphical elements; and determining that the first deictic reference refers to the graphical element in accordance with a determination that a relevance score of the graphical element is the highest relevance score of the respective relevance scores.

5. The non-transitory computer-readable storage medium of claim 4, wherein the one or more programs further comprise instructions, which when executed by the one or more processors, cause the electronic device to:

decrease each of the respective relevance scores over time.

6. The non-transitory computer-readable storage medium of claim 1, wherein the one or more programs further comprise instructions, which when executed by the one or more processors, cause the electronic device to:

detect a user gesture input, wherein determining that the first deictic reference refers to the graphical element includes:

determining that the first deictic reference refers to the graphical element based on the user gesture input.

7. The non-transitory computer-readable storage medium of claim 6, wherein determining that the first deictic reference refers to the graphical element based on the user gesture input includes determining the user gesture input corresponds to a selection of the graphical element at the first time.

8. The non-transitory computer-readable storage medium of claim 1, wherein determining that the first deictic reference refers to the graphical element includes determining a frequency of user interaction with graphical elements of a same type as the graphical element.

9. The non-transitory computer-readable storage medium of claim 1, wherein determining that the first deictic reference refers to the graphical element includes determining a recency of user interaction with the graphical element.

10. The non-transitory computer-readable storage medium of claim 1, wherein the one or more programs further comprise instructions, which when executed by the one or more processors, cause the electronic device to:

provide a first output indicative of a request for user confirmation that the first deictic reference refers to the graphical element; and after providing the first output, receive a first user input confirming that the first deictic reference refers to the graphical element, wherein the first set of one or more criteria includes a third criterion that is satisfied when the electronic device receives the first user input confirming that the first deictic reference refers to the graphical element.

11. The non-transitory computer-readable storage medium of claim 1, wherein the one or more programs further comprise instructions, which when executed by the one or more processors, cause the electronic device to:

detect a second user gesture input, wherein determining that the second deictic reference refers to the second display location includes determining that the second user gesture input corresponds to a selection of the second display location at the third time corresponding to when the second deictic reference is recognized by the electronic device.

12. The non-transitory computer-readable storage medium of claim 1, wherein the one or more programs further comprise instructions, which when executed by the one or more processors, cause the electronic device to:

provide a second output indicative of a request for user confirmation that the second deictic reference refers to the second display location; and after providing the second output, receive a second user input confirming that the second deictic reference refers to the second display location, wherein the first set of one or more criteria includes a third criterion that is satisfied when the electronic device receives the second user input confirming that the second deictic reference refers to the second display location.

13. The non-transitory computer-readable storage medium of claim 1, wherein:

the natural language input specifies an application corresponding to the second display location;

a user interface of the application is displayed when the natural language input is received; and the second display location corresponds to the user interface of the application.

14. The non-transitory computer-readable storage medium of claim 1, wherein the one or more programs further comprise instructions, which when executed by the one or more processors, cause the electronic device to:

in accordance with determining that the first deictic reference refers to the graphical element:

visually indicate the graphical element.

15. The non-transitory computer-readable storage medium of claim 1, wherein displaying the graphical element at the second display location includes:

in accordance with the determination that the first set of one or more criteria is satisfied:

executing a first task flow to obtain first data represented by the graphical element; and after executing the first task flow, executing a second task flow using the first data and the second display location to display the graphical element at the second display location.

16. An electronic device comprising:

a display;

one or more processors;

a memory; and one or more programs, wherein the one or more programs are stored in the memory and configured to be executed by the one or more processors, the one or more programs including instructions for:

while displaying, on the display, a graphical element having a first display location:

receiving input to invoke a digital assistant operating on the electronic device; and receiving a natural language input including a first deictic reference to the graphical element and a second deictic reference to a second display location, wherein the natural language input corresponds to a user intent to move or copy the graphical element;

in response to receiving the input to invoke the digital assistant, invoking the digital assistant, wherein user gaze input is detected in response to invoking the digital assistant;

determining the natural language input corresponds to the user intent to move or copy the graphical element; and in accordance with the determination that the natural language input corresponds to the user intent to move or copy the graphical element:

determining, based on the detected user gaze input, that the first deictic reference refers to the graphical element, including:

determining a first time when the first deictic reference is recognized;

determining, based on the first time, a first predetermined time window around the first time; and determining that a user gaze is directed to the graphical element at a second time that is within the first predetermined time window around the first time;

determining that the second deictic reference refers to the second display location, wherein determining that the second deictic reference refers to the second display location includes:

determining a third time when the second deictic reference is recognized, wherein the third time is different from the first time;

determining, based on the third time, a second predetermined time window around the third time; and determining that a second user gaze is directed to the second display location at a fourth time that is within the second predetermined time window around the third time; and in accordance with a determination that a first set of one or more criteria is satisfied, displaying the graphical element at the second display location different from the first display location, wherein the first set of one or more criteria includes:

a first criterion that is satisfied when the first deictic reference is determined to refer to the graphical element; and a second criterion that is satisfied when the second deictic reference is determined to refer to the second display location.

17. A method, comprising:

at an electronic device with one or more processors, memory, and a display:

while displaying, on the display, a graphical element having a first display location:

receiving input to invoke a digital assistant operating on the electronic device; and receiving a natural language input including a first deictic reference to the graphical element and a second deictic reference to a second display location, wherein the natural language input corresponds to a user intent to move or copy the graphical element;

in response to receiving the input to invoke the digital assistant, invoking the digital assistant, wherein user gaze input is detected in response to invoking the digital assistant;

determining the natural language input corresponds to the user intent to move or copy the graphical element; and in accordance with the determination that the natural language input corresponds to the user intent to move or copy the graphical element:

determining, based on the detected user gaze input, that the first deictic reference refers to the graphical element, including:

determining a first time when the first deictic reference is recognized;

determining, based on the first time, a first predetermined time window around the first time; and determining that a user gaze is directed to the graphical element at a second time that is within the first predetermined time window around the first time;

determining that the second deictic reference refers to the second display location, wherein determining that the second deictic reference refers to the second display location includes:

determining a third time when the second deictic reference is recognized, wherein the third time is different from the first time;

determining, based on the third time, a second predetermined time window around the third time; and determining that a second user gaze is directed to the second display location at a fourth time that is within the second predetermined time window around the third time; and in accordance with a determination that a first set of one or more criteria is satisfied, displaying the graphical element at the second display location different from the first display location, wherein the first set of one or more criteria includes:

a first criterion that is satisfied when the first deictic reference is determined to refer to the graphical element; and a second criterion that is satisfied when the second deictic reference is determined to refer to the second display location.

18. The electronic device of claim 16, wherein the first display location corresponds to a first directory and the second display location corresponds to a second directory, and wherein displaying the graphical element at the second display location includes associating the graphical element with the second directory.

19. The electronic device of claim 16, wherein the first display location corresponds to a first application of the electronic device and the second display location corresponds to a different second application of the electronic device.

20. The electronic device of claim 16, wherein determining that the first deictic reference refers to the graphical element includes:

identifying a first set of graphical elements displayed while the natural language input is received, wherein:

each graphical element of the first set of graphical elements corresponds to a same predetermined type of action; and the first set of graphical elements includes the graphical element;

determining, based on user interaction data, a respective relevance score of each graphical element of the first set of graphical elements; and determining that the first deictic reference refers to the graphical element in accordance with a determination that a relevance score of the graphical element is the highest relevance score of the respective relevance scores.

21. The electronic device of claim 20, wherein the one or more programs further include instructions for:

decreasing each of the respective relevance scores over time.

22. The electronic device of claim 16, wherein the one or more programs further include instructions for:

detecting a user gesture input, wherein determining that the first deictic reference refers to the graphical element includes:

determining that the first deictic reference refers to the graphical element based on the user gesture input.

23. The electronic device of claim 22, wherein determining that the first deictic reference refers to the graphical element based on the user gesture input includes determining the user gesture input corresponds to a selection of the graphical element at the first time.

24. The electronic device of claim 16, wherein determining that the first deictic reference refers to the graphical element includes determining a frequency of user interaction with graphical elements of a same type as the graphical element.

25. The electronic device of claim 16, wherein determining that the first deictic reference refers to the graphical element includes determining a recency of user interaction with the graphical element.

26. The electronic device of claim 16, wherein the one or more programs further include instructions for:

providing a first output indicative of a request for user confirmation that the first deictic reference refers to the graphical element; and after providing the first output, receiving a first user input confirming that the first deictic reference refers to the graphical element, wherein the first set of one or more criteria includes a third criterion that is satisfied when the electronic device receives the first user input confirming that the first deictic reference refers to the graphical element.

27. The electronic device of claim 16, wherein the one or more programs further include instructions for:

detecting a second user gesture input, wherein determining that the second deictic reference refers to the second display location includes determining that the second user gesture input corresponds to a selection of the second display location at the third time corresponding to when the second deictic reference is recognized by the electronic device.

28. The electronic device of claim 16, wherein the one or more programs further include instructions for:

providing a second output indicative of a request for user confirmation that the second deictic reference refers to the second display location; and after providing the second output, receiving a second user input confirming that the second deictic reference refers to the second display location, wherein the first set of one or more criteria includes a third criterion that is satisfied when the electronic device receives the second user input confirming that the second deictic reference refers to the second display location.

29. The electronic device of claim 16, wherein:

the natural language input specifies an application corresponding to the second display location;

a user interface of the application is displayed when the natural language input is received; and the second display location corresponds to the user interface of the application.

30. The electronic device of claim 16, wherein the one or more programs further include instructions for:

in accordance with determining that the first deictic reference refers to the graphical element:

visually indicating the graphical element.

31. The electronic device of claim 16, wherein displaying the graphical element at the second display location includes:

in accordance with the determination that the first set of one or more criteria is satisfied:

executing a first task flow to obtain first data represented by the graphical element; and after executing the first task flow, executing a second task flow using the first data and the second display location to display the graphical element at the second display location.

32. The method of claim 17, wherein the first display location corresponds to a first directory and the second display location corresponds to a second directory, and wherein displaying the graphical element at the second display location includes associating the graphical element with the second directory.

33. The method of claim 17, wherein the first display location corresponds to a first application of the electronic device and the second display location corresponds to a different second application of the electronic device.

34. The method of claim 17, wherein determining that the first deictic reference refers to the graphical element includes:

identifying a first set of graphical elements displayed while the natural language input is received, wherein:

each graphical element of the first set of graphical elements corresponds to a same predetermined type of action; and the first set of graphical elements includes the graphical element;

determining, based on user interaction data, a respective relevance score of each graphical element of the first set of graphical elements; and determining that the first deictic reference refers to the graphical element in accordance with a determination that a relevance score of the graphical element is the highest relevance score of the respective relevance scores.

35. The method of claim 34, further comprising:

decreasing each of the respective relevance scores over time.

36. The method of claim 17, further comprising:

detecting a user gesture input, wherein determining that the first deictic reference refers to the graphical element includes:

determining that the first deictic reference refers to the graphical element based on the user gesture input.

37. The method of claim 36, wherein determining that the first deictic reference refers to the graphical element based on the user gesture input includes determining the user gesture input corresponds to a selection of the graphical element at the first time.

38. The method of claim 17, wherein determining that the first deictic reference refers to the graphical element includes determining a frequency of user interaction with graphical elements of a same type as the graphical element.

39. The method of claim 17, wherein determining that the first deictic reference refers to the graphical element includes determining a recency of user interaction with the graphical element.

40. The method of claim 17, further comprising:

providing a first output indicative of a request for user confirmation that the first deictic reference refers to the graphical element; and after providing the first output, receiving a first user input confirming that the first deictic reference refers to the graphical element, wherein the first set of one or more criteria includes a third criterion that is satisfied when the electronic device receives the first user input confirming that the first deictic reference refers to the graphical element.

41. The method of claim 17, further comprising:

detecting a second user gesture input, wherein determining that the second deictic reference refers to the second display location includes determining that the second user gesture input corresponds to a selection of the second display location at the third time corresponding to when the second deictic reference is recognized by the electronic device.

42. The method of claim 17, further comprising:

providing a second output indicative of a request for user confirmation that the second deictic reference refers to the second display location; and after providing the second output, receiving a second user input confirming that the second deictic reference refers to the second display location, wherein the first set of one or more criteria includes a third criterion that is satisfied when the electronic device receives the second user input confirming that the second deictic reference refers to the second display location.

43. The method of claim 17, wherein:

the natural language input specifies an application corresponding to the second display location;

a user interface of the application is displayed when the natural language input is received; and the second display location corresponds to the user interface of the application.

44. The method of claim 17, further comprising:

in accordance with determining that the first deictic reference refers to the graphical element:

visually indicating the graphical element.

45. The method of claim 17, wherein displaying the graphical element at the second display location includes:

in accordance with the determination that the first set of one or more criteria is satisfied:

executing a first task flow to obtain first data represented by the graphical element; and after executing the first task flow, executing a second task flow using the first data and the second display location to display the graphical element at the second display location.

* * * * *